(12) United States Patent
Kumar et al.

(10) Patent No.: US 12,294,842 B2
(45) Date of Patent: May 6, 2025

(54) METHOD AND SYSTEM FOR SWITCHING WIRELESS AUDIO CONNECTIONS DURING A CALL

(71) Applicant: Apple Inc., Cupertino, CA (US)

(72) Inventors: Aarti Kumar, Los Altos, CA (US); Joseph M. Williams, Morgan Hill, CA (US); Dhandapani Dharumalingam, Fremont, CA (US); Taylor G. Carrigan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 17/738,941

(22) Filed: May 6, 2022

(65) Prior Publication Data

US 2022/0369034 A1    Nov. 17, 2022

Related U.S. Application Data

(60) Provisional application No. 63/189,074, filed on May 15, 2021.

(51) Int. Cl.
| | |
|---|---|
| *H04R 5/04* | (2006.01) |
| *H04B 17/318* | (2015.01) |
| *H04M 1/60* | (2006.01) |
| *H04R 1/02* | (2006.01) |
| *H04R 5/033* | (2006.01) |

(52) U.S. Cl.
CPC .............. *H04R 5/04* (2013.01); *H04B 17/318* (2015.01); *H04M 1/6066* (2013.01); *H04R 1/028* (2013.01); *H04R 5/033* (2013.01); *H04R 2420/07* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 11,150,866 B2 * | 10/2021 | Rand | G10L 15/08 |
| 11,533,531 B1 | 12/2022 | Link | |
| 2016/0214015 A1 * | 7/2016 | Osman | G06F 3/013 |

(Continued)

FOREIGN PATENT DOCUMENTS

| | | |
|---|---|---|
| CN | 101112082 A | 1/2008 |
| CN | 105872835 A | 8/2016 |

(Continued)

*Primary Examiner* — Paul W Huber
(74) *Attorney, Agent, or Firm* — Aikin & Gallant, LLP

(57) ABSTRACT

A method performed by a first electronic device that is communicatively coupled to a wireless headset, the method includes, while engaged in a call with a second electronic device, communicating with the wireless headset via a bi-directional wireless audio connection; determining that a joint media playback session has been initiated in which the first and second electronic devices are to independently stream media content for separate playback by both of the first and second electronic devices while engaging in the call; and switching to communicate with the wireless headset via a uni-directional wireless audio connection based on a determination of one or more capabilities of the wireless headset, wherein a mix of 1) one or more signals associated with the call and 2) an audio signal of the media content is transmitted to the wireless headset over the uni-directional wireless audio connection.

26 Claims, 19 Drawing Sheets

(56) References Cited

U.S. PATENT DOCUMENTS

| | | |
|---|---|---|
| 2017/0026509 A1 | 1/2017 | Rand |
| 2017/0060526 A1 | 3/2017 | Barton et al. |
| 2017/0263267 A1 | 9/2017 | Dusan et al. |
| 2020/0380992 A1 | 12/2020 | Lukens et al. |
| 2022/0070524 A1 | 3/2022 | Iyer et al. |

FOREIGN PATENT DOCUMENTS

| | | |
|---|---|---|
| CN | 106488302 A | 3/2017 |
| CN | 112135197 A | 12/2020 |

* cited by examiner

METHOD AND SYSTEM FOR SWITCHING WIRELESS AUDIO CONNECTIONS DURING A CALL

CROSS-REFERENCE TO RELATED APPLICATION

This application claims the benefit of and priority to U.S. Provisional Patent Application Ser. No. 63/189,074 filed May 15, 2021, which is hereby incorporated by this reference in its entirety.

FIELD

An aspect of the disclosure relates to an audio system that switches between wireless audio connections during a call based on certain criteria. Other aspects are also described.

BACKGROUND

Many devices today, such as a smartphone, are capable of various types of telecommunication with other devices. For example, a smartphone may perform a phone call with another device. In which case, when a telephone number is dialed, the smartphone connects to a cellular network, which may then connect the smartphone with another device (e.g., another smart phone or a landline). In addition, the smartphone may also be able to conduct a video conference call in which video data and audio data are exchanged with another device.

SUMMARY

An aspect of the disclosure is a method performed by a first electronic device (e.g., a local device) that is communicatively coupled to an audio output device (e.g., a wireless headset). While engaged in a call with a second electronic device (e.g., a remote device), the local device communicates with the wireless headset via a bi-directional wireless audio connection (e.g., in which audio data may be exchanged between both devices). The local device determines that a joint media playback session has been initiated in which the local and remote devices are to independently stream media content for separate playback by both devices while engaging in the call. The local device switches to communicate with the wireless headset via a uni-directional wireless audio connection (e.g., in which audio data is only transmitted from the local device to the wireless headset) based on a determination of one or more capabilities of the wireless headset, where a mix of 1) one or more signals associated with the call and 2) an audio signal of the media content is transmitted to the wireless headset from the local device over the uni-directional wireless audio connection.

In one aspect, the determination of the one or more capabilities of the wireless headset includes determining whether the wireless headset supports exchanging, via the bi-directional wireless audio connection, audio signals with the local device at a sampling rate that is at least a threshold sampling rate (e.g., 24 kHz). In some aspects, the local device transmits a signal to mute a microphone of the wireless headset and activates a microphone of the local device to capture a user's voice. In one aspect, the local device displays a pop-up notification on a display screen indicating that the microphone of the wireless headset is muted and requesting user-authentication to activate the microphone of the local device, where the microphone of the local device is activated in response to receiving user input at the local device.

In one aspect, the local device may receive sensor data from at least one sensor that indicates whether an object is within a threshold distance of the local device and, in response to the object being within the threshold distance, switching to communicate with the wireless headset via the bi-directional wireless audio connection. In another aspect, the local device determines a signal strength of the uni-directional wireless audio connection and, in response to determining that the signal strength is below a threshold value, switching to communicate with the wireless headset via the bi-directional audio connection.

In some aspects, the local device may receive, from the wireless headset, a control signal that indicates a detection of a user's voice and, in response to the control signal, switching to communicate with the wireless headset via the bi-directional wireless audio connection. In one aspect, the control signal is a first control signal, and, in response to receiving a second control signal that indicates the user's voice is no longer detected, switching back to communicate with the wireless headset via the uni-directional wireless audio connection.

In one aspect, the local device applies a scalar gain on the mix for at least a period of time after switching to communicate with the wireless headset via the uni-directional wireless audio connection. In another aspect, the local device applies, while communicating with the wireless headset via the bi-directional wireless audio connection, noise reduction to the one or more signals associated with the call. In another aspect, the local device may cease to apply the noise reduction to the one or more signals associated with the call in response to switching to communicate with the wireless headset via the uni-directional wireless audio connection. In some aspects, while the local device communicates with the wireless headset via the uni-directional wireless audio connection, the local device obtains a microphone signal form a microphone of the local device to be transmitted to the remote device while both devices are engaged in the call, generates an estimate of a portion of the one or more signals associated with the call, and uses the estimate to perform echo cancellation upon the microphone signal.

Another aspect of the disclosure is a method performed by the wireless headset that includes communicating, during a call between the local device and the remote device, with the local device over a bi-directional wireless audio connection. The headset determines that a uni-directional wireless audio connection is to be established between the local device and the wireless headset in lieu of the bi-directional wireless audio connection during the call. In response to determining that the uni-directional wireless audio connection is to be established, muting a microphone of the wireless headset and switching from the bi-directional wireless audio connection to the uni-directional wireless audio connection. The wireless headset receives, over the uni-directional wireless audio connection, an audio signal that includes a mix of a signal associated with the call and a signal associated with media content that is being played back by the local device and remote device in a joint media playback session. The wireless headset drives a speaker suing the audio signal.

In one aspect, the bi-directional wireless audio connection supports exchanging audio signals at a sampling rate that is lower than a sampling rate at which the uni-directional wireless audio connection supports transmitting audio signals. In some aspects, determining that the uni-directional wireless audio connection is to be established includes receiving, from the local device, a control signal to establish the uni-directional wireless audio connection. In one aspect, the wireless headset detects, using an accelerometer, a user's voice, and, in response to detecting the user's voice, switching from the uni-directional wireless audio connection to the bi-directional wireless audio connection. In some aspects, in response to detecting the user's voice, activating the microphone of the wireless headset and transmitting a microphone signal produced by the microphone, via the bi-directional wireless audio connection, to the local device for the call. In another aspect, in response to ceasing to detect the user's voice, the wireless headset mutes the microphone and switches form the bi-directional wireless audio connection to the uni-directional wireless audio connection.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Figure 1:
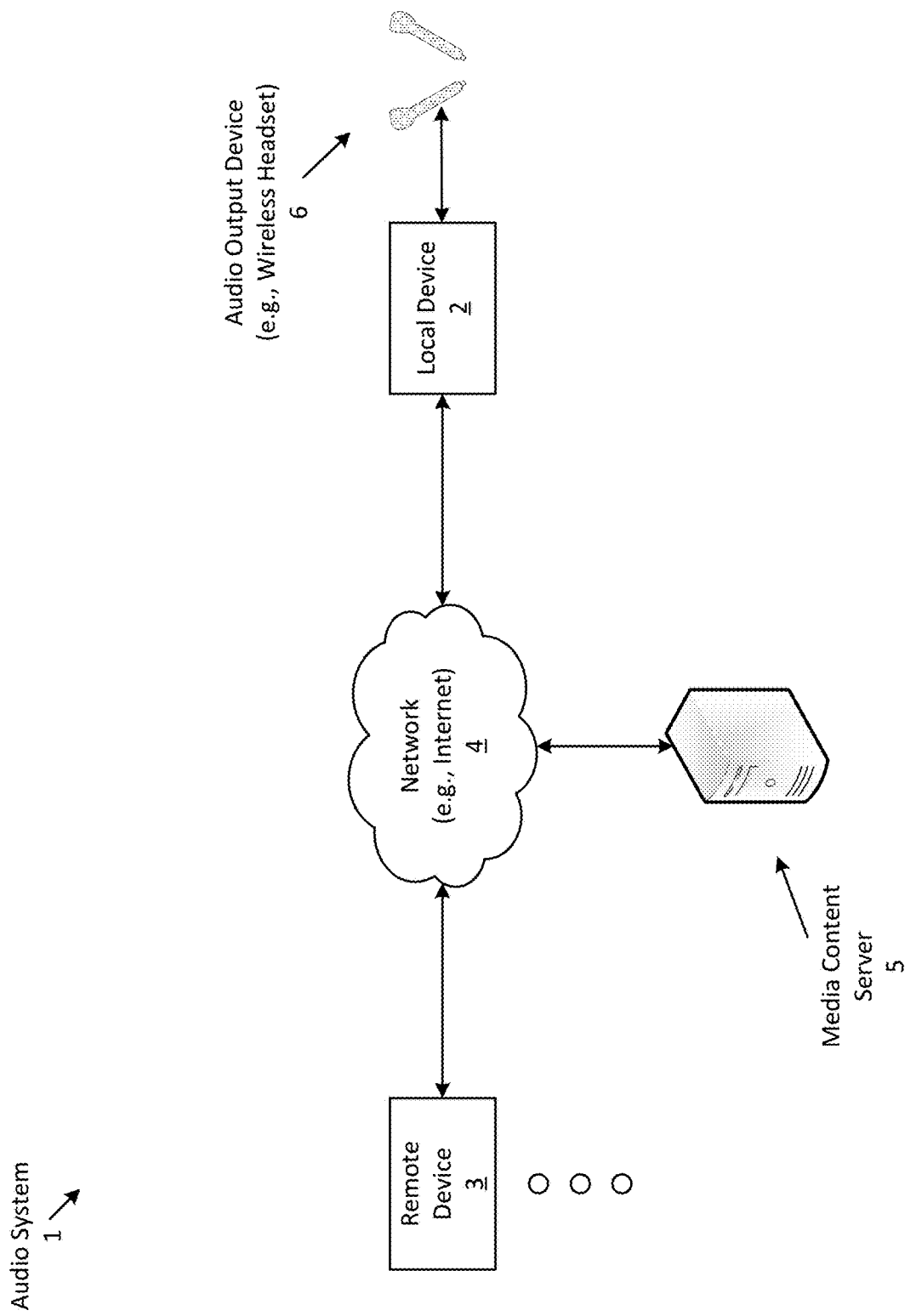
FIG. 1 shows an audio system that includes a local device and one or more remote devices that engage in a call while performing a joint media playback session according to one aspect.

FIG. 1 shows an audio system 1 that includes a local device and one or more remote devices that engage in a call while performing a joint media playback session according to one aspect. As described herein, this may allow users of the devices to listen to (and/or watch) media content (e.g., on one or more of the devices) while participating in a conversation with one another. The audio system includes a local (or first electronic) device 2, a remote (or second electronic) device 3, a network 4 (e.g., a computer network, such as the Internet), a media content server 5, and an audio output device 6. In one aspect, the system may include more or less elements. For instance, the system may have one or more remote devices, where all of the devices are engaged in the call and the joint media playback session with one another and with the local device, as described herein. In another aspect, the audio system may include one or more remote (electronic) servers that are communicatively coupled with at least some of the devices of the audio system 1, and may be configured to perform at least some of the operations described herein. In another aspect, the system may not include an audio output device. In which case, the local device may perform audio output operations (e.g., using one or more signals to drive one or more speakers).

In one aspect, the local device (and/or the remote device) may be any electronic device (e.g., with electronic components, such as a processor, memory, etc.) that is capable of engaging in a call, such as a telephony (or "voice-only" call) or a video (conference) call, while performing a joint media playback session with one or more other devices (e.g., one or more remote devices) in which (at least some of) the devices simultaneously playback media content (e.g., a musical composition, a movie, etc.). More about simultaneous playback of media content is described herein. For example, the local device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch. In one aspect, the remote device(s) may be the same type of device as the local device (e.g., both devices being smart phones). In another aspect, at least some of the remote devices may be different, such as some being desktop computers, while others are smart phones.

As illustrated, the local device 2 is (e.g., communicatively) coupled to the remote device 3 and/or the media content server 5 via the computer network (e.g., Internet) 4. Specifically, the local and remote devices may be configured to establish and engage in a telephony (or voice-only) call in which the devices that are engaged within the call exchange audio data. For instance, each device transmits at least one microphone signal as an uplink audio signal to the other devices engaged in the call, and receives at least one audio signal as a downlink audio signal from the other devices for playback by one or more speakers. In one aspect, the network may include a Public Switched Telephone Network (PSTN), over which the local device and the remote device(s) may be capable of placing outgoing calls and/or receiving incoming calls. In another aspect, the local device may be configured to establish an Internet Protocol (IP) telephony (or Voice over IP (VoIP)) call with one or more remote devices via the network (e.g., the Internet). In particular, the local device may use any signaling protocol (e.g., Session Initiation Protocol (SIP)) to establish a communication session and use any communication protocol (e.g., Transmission Control Protocol (TCP), Real-time Transport Protocol (RTP), etc.) to exchange audio data during a call. For example, when a call is initiated (e.g., by a telephony application executing within the local device), the local device may transmit one or more microphone signals captured by one or more microphones (e.g., as an uplink audio signal) as audio data (e.g., IP packets) to one or more remote devices, and receive one or more (e.g., downlink audio) signals from the remote devices for driving one or more speakers of the local device, via the network. In another aspect, the local device may be configured to establish a wireless (e.g., cellular) call. In which case, the network 4 may include one or more cell towers, which may be part of a communication network (e.g., a 4G Long Term Evolution (LTE) network) that supports data transmission (and/or voice calls) for electronic devices, such as mobile devices (e.g., smartphones).

In another aspect, the local and remote devices may be configured to establish and engage in a video call with one or more remote devices 3. In which case, the local device may establish the video call (e.g., similarly to a VoIP, using SIP to initiate the session and RTP to transmit data), and when established exchange video and/or audio data with one or more remote devices. For instance, the local device may include one or more cameras which capture video that is encoded using any video codec (e.g., H.264), and transmitted to the remote devices for decoding and display on one or more display screens. More about calls is described herein.

In some aspects, the media content server 5 may be a stand-alone server computer or a cluster of server computers configured to stream media content to electronic devices, such as the local and remote devices. In which case, the server may be a part of a cloud computing system that is capable of streaming data as a cloud-based service that is provided to one or more subscribers. In some aspects, the server may be configured to stream any type of media (or multi-media) content, such as audio content (e.g., musical compositions, audiobooks, podcasts, etc.), still images, video content (e.g., movies, television productions, etc.), etc. In one aspect, the server may use any audio and/or video encoding format and/or any method for streaming the content to one or more devices.

Figure 3:
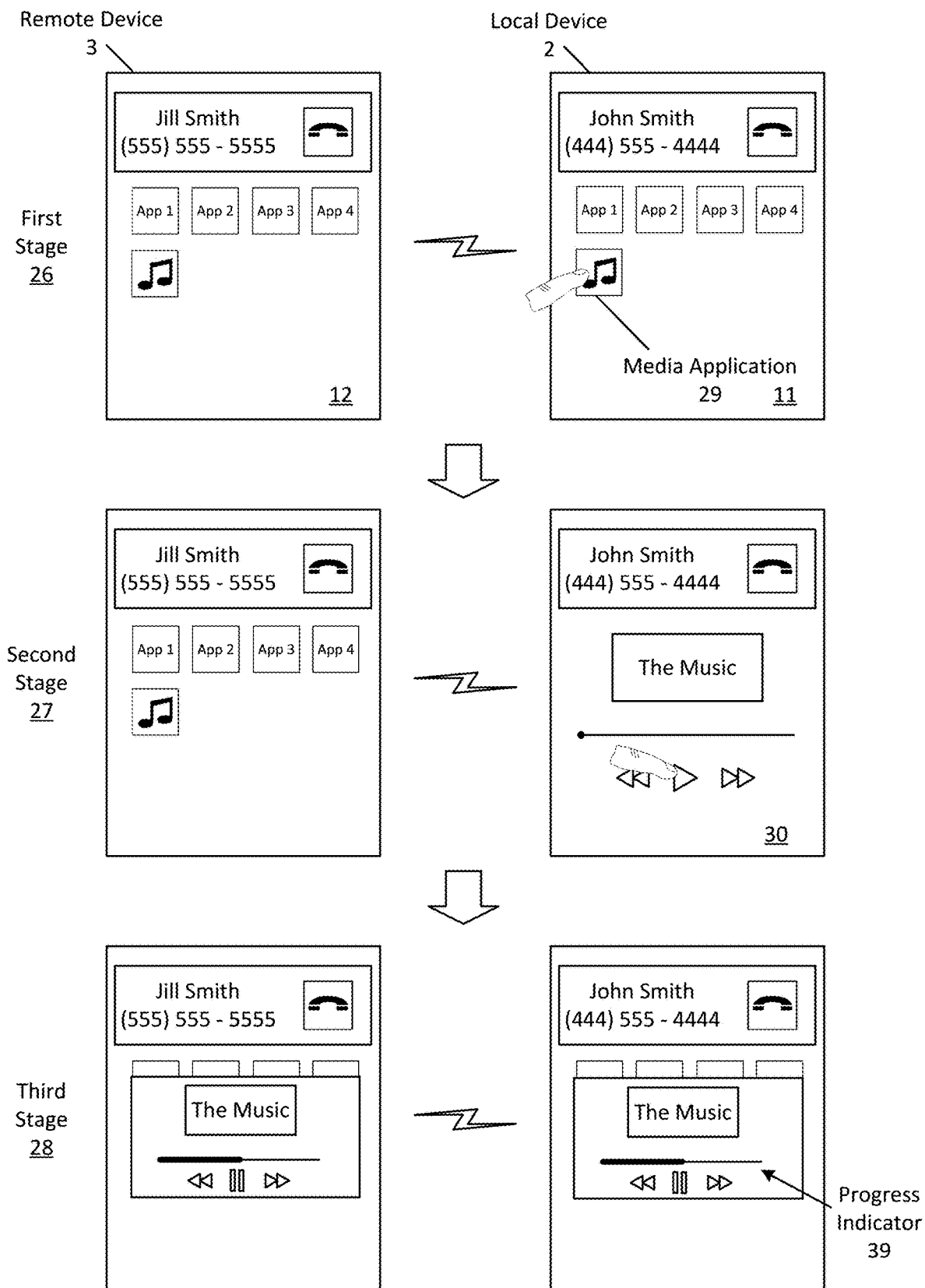
FIG. 3 illustrates several stages in which a local device and a remote device initiate a joint playback media session to synchronously playback a musical composition while engaged in a telephony call according to one aspect.
Figure 4:
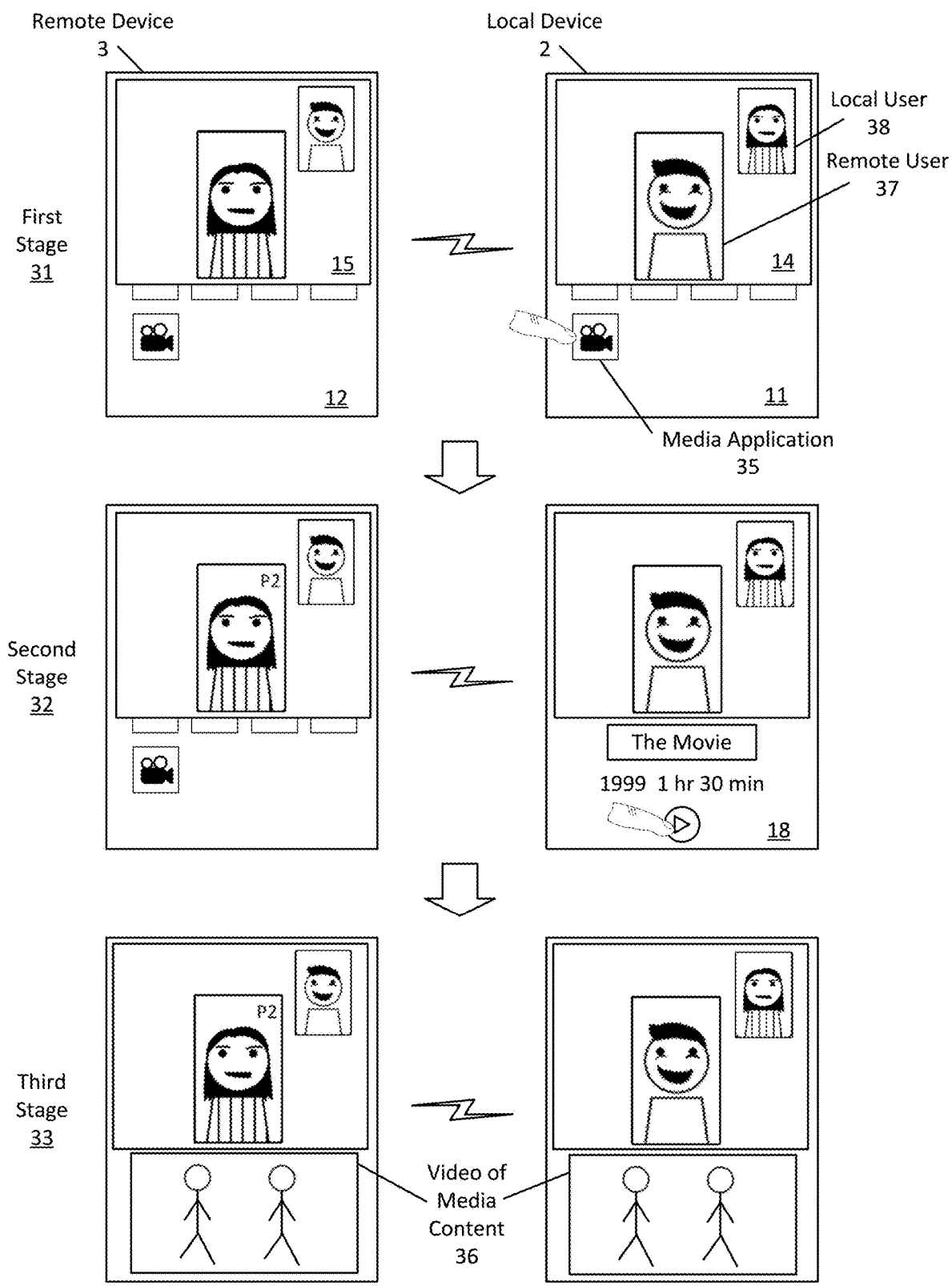
FIG. 4 illustrates several stages in which the local device and the remote device initiate a joint playback media session to synchronously playback a movie while engaged in a video call according to one aspect.

In one aspect, the media content server 5 may be configured to simultaneously stream media content to one or more devices in order to allow the devices to engage in a joint media playback session. For example, the server may receive a request from a device (e.g., local device 2) to stream a piece of media content that may include audio content (e.g., a musical composition) and/or video content (e.g., a video signal associated with a movie) with another device (e.g., remote device 3). In one aspect, the request may be transmitted by the local device (and/or the remote device(s)) in response to the device receiving user input to begin to playback the media content, as shown in FIGS. 3 and 4. In which case, the server may establish a communication link with both the local device and the remote device(s) that are already engaged in a (e.g., telephony and/or video) call. Once established, the server may encode audio content using any codec (e.g., MP3, AAC, etc.) and/or may encode video content using any codec, and transmit the encoded content to each device to be decoded and output. In another aspect, the local device may transmit a message to the remote device, requesting to initiate a joint media playback session. In response, the remote device may communicate with the media content server to retrieve the media content and to synchronize playback with the local device. In one aspect, devices that participate within the joint media playback session may output media content in sync, such that the content is output and experienced by users at the same time. In some aspects, any timing synchronization method may be used (e.g., by the devices participating within the session and/or the server) to ensure that the media is streamed simultaneously and in sync. More about the joint media playback session is described herein.

As illustrated, the audio output device 6 may be any electronic device that includes at least one speaker and is configured to performing output sound by driving the speaker. For instance, as illustrated the device is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the audio output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

In one aspect, the output device may be a wireless device that may be communicatively coupled to the local device in order to exchange audio data. For instance, the local device may be configured to establish the wireless connection with the audio output device via a wireless communication protocol (e.g., BLUETOOTH protocol or any other wireless communication protocol). During the established wireless connection, the local device may exchange (e.g., transmit and receive) data packets (e.g., Internet Protocol (IP) packets) with the audio output device, which may include audio digital data in any audio format. In particular, the local device may be configured to establish and communicate with the audio output device over a bi-directional wireless audio connection (e.g., which allows both devices to exchange audio data), for example to conduct a hands-free call or to use voice commands. Examples of a bi-directional wireless communication protocol include, without limitation the Hands-Free Profile (HFP) and the Headset Profile (HSP), both of which are BLUETOOTH communication protocols. In another aspect, the local device may be configured to establish and communication with the output device over a uni-directional wireless audio connection, such as (e.g., Advanced Audio Distribution Profile (A2DP) protocol), which allows the local device to transmit audio data to one or more audio output devices. More about these wireless audio connections is described herein.

In another aspect, the local device 2 may communicatively couple with the audio output device 6 via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the local device may be configured to drive one or more speakers of the audio output device with one or more audio signals, via the wired connection. For instance, the local device may transmit the audio signals as digital audio (e.g., PCM digital audio). In another aspect, the audio may be transmitted in analog format.

In some aspects, the local device 2 and the audio output device 6 may be distinct (separate) electronic devices, as shown herein. In another aspect, the local device may be a part of (or integrated with) the audio output device. For example, as described herein, at least some of the components of the local device (such as a controller) may be part of the audio output device, and/or at least some of the components of the audio output device may be part of the local device. In this case, each of the devices may be communicatively coupled via traces that are a part of one or more printed circuit boards (PCBs) within the audio output device.

Figure 2:
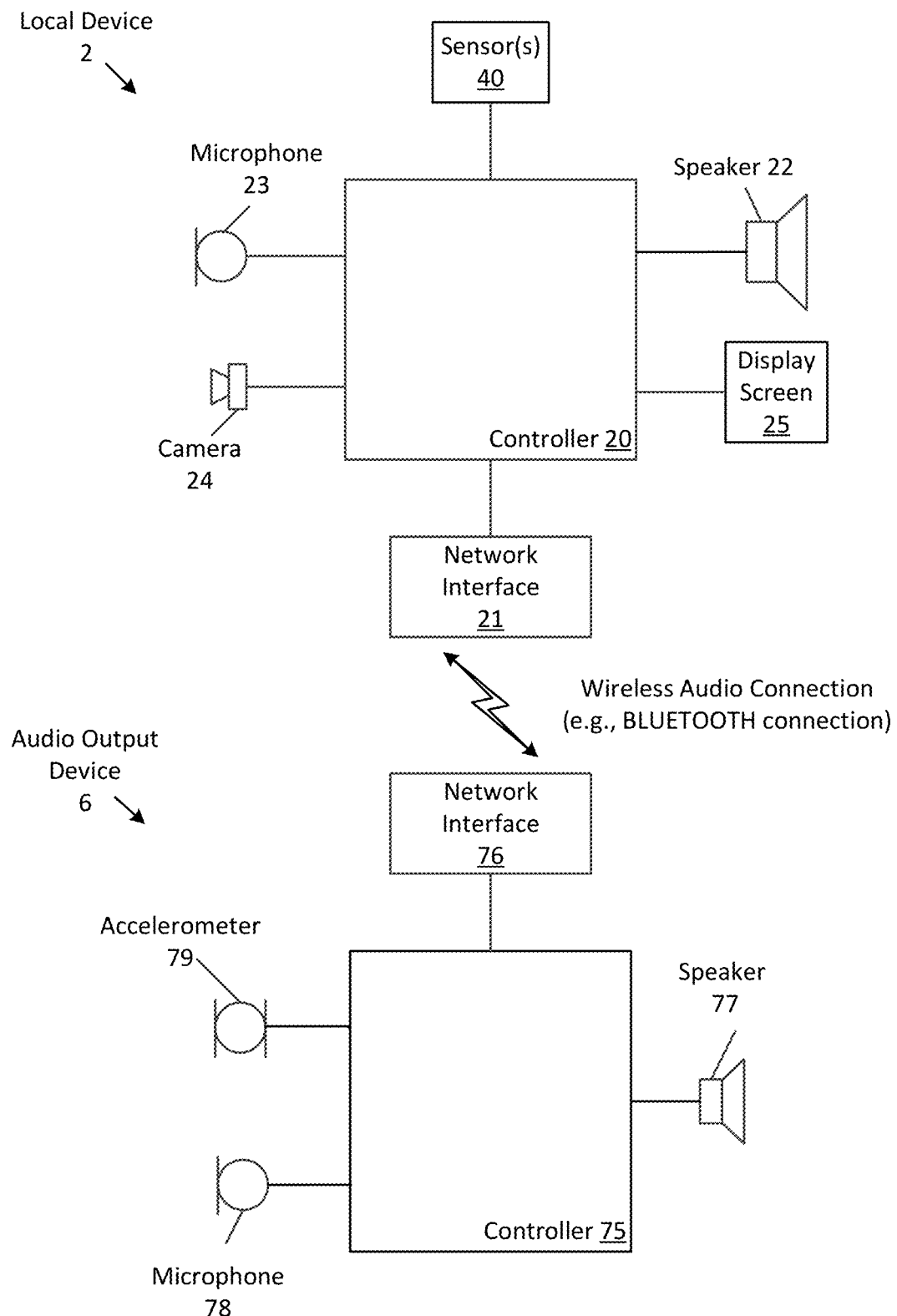
FIG. 2 shows a block diagram of the local device that initiates a joint playback media session while engaged in a call with the one or more remote devices, and of an audio output device that wirelessly communicates with the local device according to one aspect.

FIG. 2 shows a block diagram of the local device 2 that initiates a joint playback media session while engaged in a (e.g., voice or video) call with the one or more remote devices 3, and shows of an audio output device 6 that wirelessly communicates with the local device according to one aspect. The local device 2 includes a controller 20, a network interface 21, a speaker 22, a microphone 23, a camera 24, a display screen 25, and (optionally) one or more additional sensors 40. In one aspect, the local device may include more or less elements as described herein. For instance, the device may include two or more of at least some of the elements (e.g., having two or more microphones 23).

The controller 20 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 20 may be configured to engage in a call and simultaneously perform a joint media playback session to stream media content with one or more remote devices, via the network interface 21. In another aspect, the controller may be configured to perform audio signal processing operations upon audio data of the media content and/or audio data (e.g., a downlink signal) associated with an engaged call. More about the operations performed by the controller 20 is described herein.

In one aspect, the one or more sensors 40 are configured to detect the environment (e.g., in which the local device is located) and produce sensor data based on the environment. In some aspects, the controller may be configured to perform operations based on the sensor data produced by one or more sensors 40. For instance, the local device may include a (e.g., optical) proximity sensor that is designed to produce sensor data that indicates an object is at a particular distance from the sensor (and/or the local device). As another example, the local device may include an inertial measurement unit (IMU) that is designed to measure the position and/or orientation of the local device. In one aspect, the sensors may be a part of (or integrated into) the local device. In another aspect, sensors may be separate electronic devices that are communicatively coupled with the controller (e.g., via the network interface 21). For instance, the audio output device 6 may include one or more sensors, data of which may be provided to the local device via a wireless connection.

The speaker 22 may be an electrodynamic driver that may be specifically designed for sound output at certain frequency bands, such as a woofer, tweeter, or midrange driver, for example. In one aspect, the speaker 22 may be a "full-range" (or "full-band") electrodynamic driver that reproduces as much of an audible frequency range as possible. The microphone 23 may be any type of microphone (e.g., a differential pressure gradient micro-electro-mechanical system (MEMS) microphone) that is configured to convert acoustical energy caused by sound wave propagating in an acoustic environment into an input microphone signal.

In one aspect, the camera 24 is a complementary metal-oxide-semiconductor (CMOS) image sensor that is capable of capturing digital images including image data that represent a field of view of the camera 24, where the field of view includes a scene of an environment in which the device 2 is located. In some aspects, the camera may be a charged-coupled device (CCD) camera type. The camera is configured to capture still digital images and/or video that is represented by a series of digital images. In one aspect, the camera may be positioned anywhere about the local device. In some aspects, the device may include multiple cameras (e.g., where each camera may have a different field of view).

The display screen 25 is designed to present (or display) digital images or videos of video (or image) data. In one aspect, the display screen may use liquid crystal display (LCD) technology, light emitting polymer display (LPD) technology, or light emitting diode (LED) technology, although other display technologies may be used in other aspects. In some aspects, the display may be a touch-sensitive display screen that is configured to sense user input as input signals. In some aspects, the display may use any touch sensing technologies, including but not limited to capacitive, resistive, infrared, and surface acoustic wave technologies.

The audio output device 6 includes a controller 75, a network interface 76, a speaker 77, a microphone 78, and an accelerometer 79. In one aspect, the device may include more or less elements. For instance, the output device may include one or more microphones and/or one or more speakers. In some aspects, the output device may include a microphone that is an "external" (or reference) microphone that is arranged to capture sound from the acoustic environment, while having at least one other "internal" (or error) microphone that is arranged to capture sound (and/or sense pressure changes) inside a user's ear (or ear canal). In the case of an in-ear headphone, the internal microphone may sense inside the user's ear when the headphone is positioned on (or in) the user's ear.

The accelerometer 79 is arranged and configured to receive (detect or sense) speech vibrations that are produced while a user (e.g., who may be wearing the output device) is speaking, and produce an accelerometer signal that represents (or contains) the speech vibrations. Specifically, the accelerometer is configured to sense bone conduction vibrations that are transmitted from the vocal cords of the user to the user's ear (ear canal), while speaking and/or humming. For example, when the audio output device is a wireless headset, the accelerometer may be positioned anywhere on or within the headphone, which may touch a portion of the user's body in order to sense vibrations.

In one aspect, controller 75 is configured to perform audio signal processing operations and/or networking operations, as described herein. For instance, the controller may be configured to obtain (or receive) an audio data (as an analog or digital audio signal) of media content or user-desired media content (e.g., music, etc.) for playback through the speaker 77. In some aspects, the controller may obtain audio data from local memory, or the controller may obtain audio data from the network interface 76, which may obtain the data from an external source such as the local device 2 (via its network interface 21). For instance, the output device may stream an audio signal from the local device (e.g., via the BLUETOOTH connection) for playback through the speaker 77. The audio signal may be a signal input audio channel (e.g., mono). In another aspect, the controller may obtain two or more input audio channel (e.g., stereo) for output through two or more speakers. In one aspect, in the case in which the output device includes two or more speakers, the controller may perform additional audio signal processing operations. For instance, the controller may spatially render the input audio channels (e.g., by applying spatial filters, such as head related transfer functions (HRTFs)) to produce binaural output audio signals for driving at least two speakers (e.g., a left speaker and a right speaker).

In one aspect, the controller 75 may be configured to perform (additional) audio signal processing operations based on elements that are coupled to the controller. For instance, when the output device includes two or more "extra-aural" speakers, which are arranged to output sound into the acoustic environment rather than speakers that are arranged to output sound into a user's ear (e.g., as speakers of an in-ear headphone), the controller may include a sound-output beamformer that is configured to produce speaker driver signals which when driving the two or more speakers produce spatially selective sound output. Thus, when used to drive the speakers, the output device may produce directional beam patterns that may be directed to locations within the environment.

In some aspects, the controller 75 may include a sound-pickup beamformer that can be configured to process the audio (or microphone) signals produced two or more external microphones of the output device to form directional beam patterns (as one or more audio signals) for spatially selective sound pickup in certain directions, so as to be more sensitive to one or more sound source locations. In some aspects, the controller may perform audio processing operations upon the audio signals that contain the directional beam patterns (e.g., perform spectrally shaping), and/or transmit the audio signals to the local device.

In another aspect, the controller 75 may perform other functions. For example, the controller 75 may be configured to perform an active noise cancellation (ANC) function to cause the speaker 77 to produce anti-noise in order to reduce ambient noise from the environment that is leaking into the user's ears. The ANC function may be implemented as one of a feedforward ANC, a feedback ANC, or a combination thereof. As a result, the controller 75 may receive a reference microphone signal from a microphone that captures external ambient sound, such as microphone 78. In another aspect, the controller may perform any ANC method to produce the anti-noise. In another aspect, the controller 75 may perform a transparency function in which sound played back by the audio output device 6 is a reproduction of the ambient sound that is captured by the device's external microphone in a "transparent" manner, e.g., as if the headphone was not being worn by the user. The controller 75 processes at least one microphone signal captured by at least one external microphone 78 and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the controller 75 may determine the transparency filter according to a head-related transfer function (HRTF) or, equivalently, head-related impulse response (HRIR) that is based on the user's anthropometrics.

As described herein, both the local device and audio output device are configured to establish a wireless audio connection (e.g., BLUETOOTH connection) in order to exchange audio data. In one aspect, the controller 75 (and/or the controller 20) may be configured to switch between a bi-directional wireless audio connection (e.g., HFP connection) and a uni-directional wireless audio connection (e.g., A2DP connection) to communicatively couple both devices together in order exchange (and transmit) audio data. More about switching between the audio connections is described herein.

In one aspect, operations performed by the controllers may be implemented in software (e.g., as instructions stored in memory and executed by either controller) and/or may be implemented by hardware logic structures as described herein.

In another aspect, at least some of the operations performed by the controller 20 as described herein may be performed by the local device 2 and/or by the audio output device 6. For instance, the local device may include two or more speakers and may be configured to perform sound-output beamformer operations (e.g., when the local device includes two or more speakers). In another aspect, at least some of the operations may be performed by a remote server that is communicatively coupled with either device, for example over the network (e.g., Internet).

In one aspect, at least some elements of the local device 2 and/or the audio output device 6 may be integrated (or a part of) each the respective device. For example, when the audio output device is on-ear headphones, the microphone, speaker, and accelerometer may be a part of at least one earcup of the headphones that is placed on a user's ear. In another aspect, at least some of the elements may be separate electronic devices that are communicatively coupled to the device. For instance, the display screen 25 may be a separate device (e.g., being a display monitor or television) that is communicatively coupled (e.g., wired or wirelessly connected) with the local device to receive image data for display. As another example, the camera 24 may be a part of a separate electronic device (e.g., a webcam) that is coupled to the local device to provide captured image data.

As described herein, the local device 2 and remote devices 3 of the audio system 1 may perform a joint media playback session while engaged in a call in order to allow users of the devices to communicate while experiencing simultaneous media content playback. In one aspect, the local device may initiate the joint media playback session, while already engaged in a call. FIGS. 3 and 4 illustrate graphical examples of the local device and remote device initiating joint media playback, while engaged in a telephony call and a video conference call, respectively.

FIG. 3 illustrates three stages 26-28 in which the local device 2 and the remote device 3 initiate a joint playback media session to synchronously playback a musical composition while engaged in a telephony call according to one aspect. The first stage 26 shows a main (or home) screen user interface (UI) displayed on display screens of each respective device, while the devices are engaged in a telephony call. In one aspect, either device may have initiated the telephony call, as described herein. Specifically, the local device's main screen UI 11 shows caller-ID information of the remote device overlaid upon several selectable UI items, each associated with an application (e.g., App 1-App 4), including a media application 29 that when executed by the local device streams media content to the local device (e.g., from the media content server 5). Specifically, the media application 29 may be a music streaming application, which when executed streams music for playback by the speaker 22 (and/or speaker 77 of the audio output device). Similarly, the remote device's main screen UI 12 shows caller-ID information of the local device overlaid upon several (similar) UI items as those shown for the local device. In one aspect, either of the devices may have initiated the telephony call, using any known method. For instance, the user of local device may have initiated a telephony application stored within the local device, and dialed the remote device's telephone number. Once dialed, the local device may have connected to the remote device via a cellular network (e.g., a 4G Long Term Evolution (LTE) network) of the network 4, as described herein.

This stage also shows the user of the local device 2 pressing the UI item associated with the media application 29. For instance, the display screen (e.g., display screen 25 shown in FIG. 2) of the local device may be a touch-sensitive display screen, as described herein. The local device may receive user input in response to the user pressing on the UI item of the media application 29. The second stage 27 shows the result of the user pressing the UI item of the media application 29. In particular, this stage shows that a UI 30 of the media application is displayed on the display screen of the local device, which shows a title of a musical composition (e.g., "The Music"), and playback control UI items, which include a play button, a rewind button, and a fast forward button. This stage also shows that the user has pressed the "play" button.

The third stage 28 shows the result of the user of the local device selecting the play button. Specifically, once the play button is selected the local device transmits a request to the media content server 5 to begin to stream the media content to the remote device and the local device. In one aspect, when multiple devices are conducting a call together (e.g., a conference call), the media content server 5 may stream the media content to each of the devices that are participating within the conference call. As a result, both the remote device and the local device playback the media content (e.g., by driving respective speakers with audio data of the media content that is received from the media content server. Both of the devices are thus playing back the content simultaneously and in sync, which is illustrated by the progress indicator 39 of both of the devices shown in respective media application UIs being at the halfway mark. More about playing back media content simultaneously is described herein.

FIG. 4 illustrates three stages 31-33 in which the local device 2 and the remote device 3 initiate a joint playback media session to synchronously playback a movie while engaged in a video call according to one aspect. The first stage 31 shows the main screen UI displayed on display screens of each respective device, while the devices are engaged in a video call. In particular, overlaid on the local device's main screen UI 11 is a video call UI 14 that shows a video representation of the local user 38 in the top right of the UI and a video representation of the remote user 37 (which is larger than the representation of the local user) positioned in the middle of the video call UI. Similarly, overlaid on the remote device's main screen UI 12 is a video call UI 15 that shows the video representation of the remote user in the middle and the video representation of the local user in the top right of the UI. In one aspect, the video representations may be produced using video data captured by one or more cameras of each device. For example, while the local user is in the field of view of camera 24, the camera may capture video data of the local user, which is then displayed on the local device and transmitted (e.g., via network 4) to the remote device for displaying on the remote device's screen.

This stage also shows the local user selecting a selectable UI item associated with a media application 35 within the main screen UI 11, which may be a video streaming application. The second stage 32 shows the result of the user pressing the UI item of the media application 35. In particular, this stage shows a UI 18 of the media application 35 is displayed on the display screen of the local device, which shows a title of a movie (e.g., "The Movie"), a playback duration of one hour and thirty minutes, and a play button, which is being pressed by the local user.

The third stage 33 shows the result of the local user selecting the play button in the media application UI 18. In particular, once the play button is selected the local device transmits a request to the media content server 5 to begin to stream the media content (e.g., audio and video data of the movie) to the devices that are engaged in the video call. As a result, both devices are playing back video of the media content 36 (and outputting audio of the media content) in sync, while still engaged in the video call.

As shown in these examples, audio content may be played back in a joint media playback session while devices are engaged in a telephony call, and video and audio content may be played back during the session while the devices are engaged in a video call. In another aspect, any type of media content may be played back during a joint media playback session while local and remote devices are engaged in either a telephony call or a video call. For instance, while the devices are engaged in a telephony call, a movie may be played back during a joint media playback session.

While engaging in a joint media playback session during a call may provide participants with a better user media experience with respect to the media content being played back across the participants' devices (e.g., by allowing participants to discuss media content of the playback session in real-time), there may be some drawbacks. For instance, a conversation between participants may drown out or mask sound of the media content. As an example, when participants are watching a movie, the conversation between the participants may be indistinguishable from dialogue of the movie that is being output contemporaneously. As a result, participants engaging in these side conversations may find it difficult to talk while the movie is playing. In addition, this may also degrade the overall user experience of those participants who are not engaged in these conversations, since the conversation may distract them from focusing their full attention to the sound of the movie. Thus, there is a need for preserving media audio playback quality while participants are engaged in the joint media playback session during a call.

To overcome these deficiencies, the present disclosure describes an audio system that is capable of preserving audio quality of media content playback during a media playback session by processing remote active speech during a call. Specifically, the audio system, while engaged in a call and a joint media playback session in which a local device and (at least one) remote device are independently streaming media content for synchronous playback, determines that a downlink (audio) signal from the remote device includes speech based on output from a voice activity detector (VAD). If so, the audio system applies a scalar again to an audio signal of the media content to reduce a signal level of the audio signal. The audio system then drives a speaker with a mix of the downlink signal and the audio signal. Thus, the system may manage the signal level of the media content while participants of remote devices are speaking.

Figure 5:
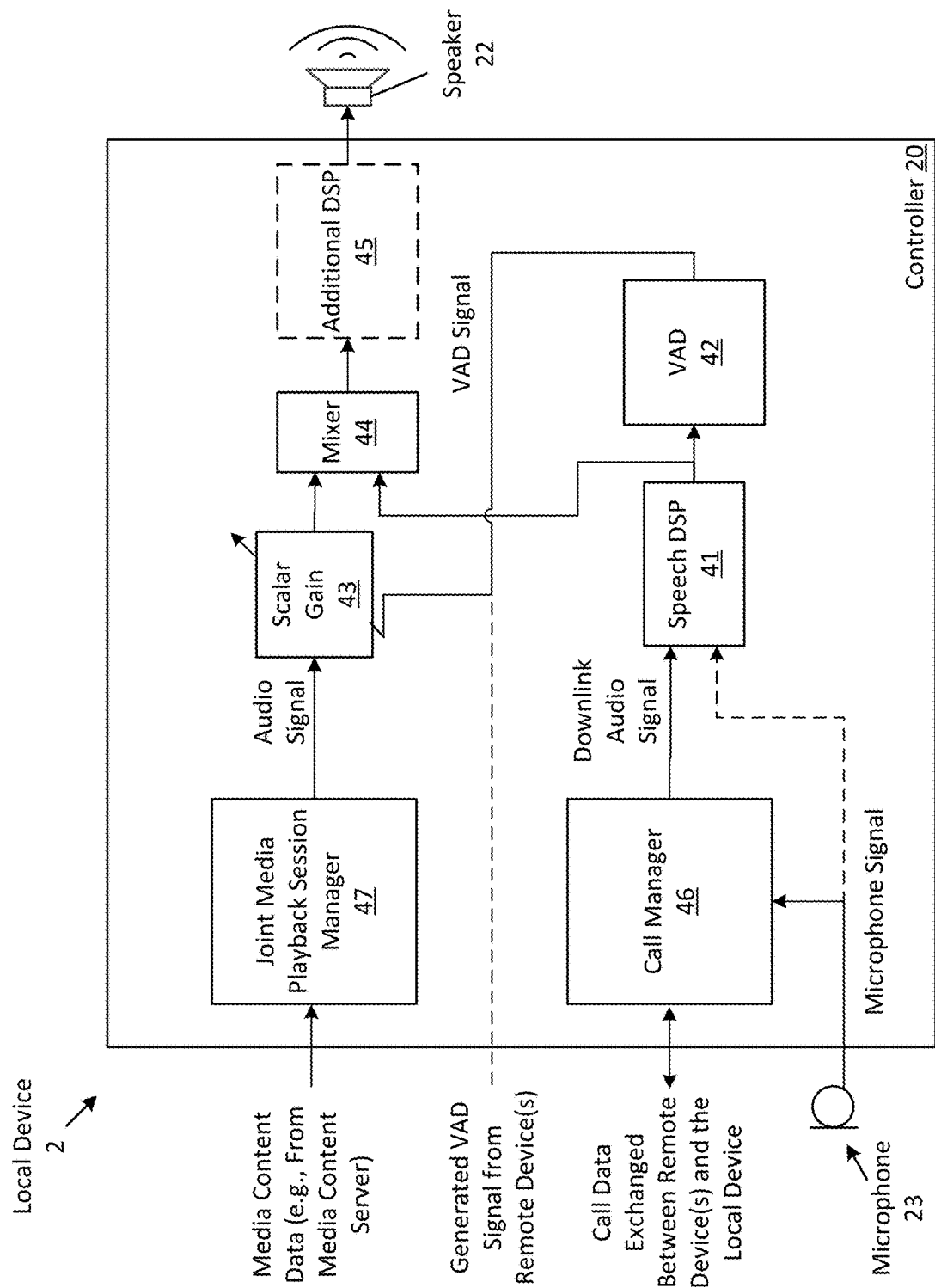
FIG. 5 shows a block diagram of the local device that performs audio signal processing operations upon an audio signal of media content based on whether speech is detected within a signal of a telephony call performed between the local device and remote device according to one aspect.

FIG. 5 shows a block diagram of the local device 2 that performs audio signal processing operations upon an audio signal of media content based on whether speech is detected within a signal of a telephony call performed between the local device 2 and at least one remote device 3 according to one aspect. Specifically, this figure shows that the controller 20 has several operational blocks for performing audio signal processing operations to process remote active speech during a call and a joint media playback session. As shown, the controller includes a call manager 46, a joint media playback session manager 47, a speech digital signal processor (DSP) 41, a voice activity detector (VAD) 42, a scalar gain 43, a (e.g., matrix) mixer 44, and an (optional) additional DSP 45.

The call manager 46 is configured to initiate (and conduct) a call between the local device 2 and one or more remote devices 3. In one aspect, the call manager may initiate the call in response to user input. For example, the call manager may be a part of (or receive instructions from) a telephony application that is being executed by the (e.g., controller 20 of the) local device. For instance, the telephony application may display a UI on the display screen 25 of the local device, which may provide a user of the local device the ability to initiate the call (e.g., a keypad, a contacts list, etc.). Once the UI receives user input (e.g., a dialing of a remote user's telephone number using the keypad), the call manager may communicate with the network interface 21 of the local device 2 to establish the call, as described herein. In one aspect, the telephony call may be over any network, such as over the PSTN and/or over the Internet (e.g., for a VoIP call). In some aspects, the call manager may initiate the call, as described herein, and/or using any method.

Once initiated, the call manager may exchange call data between the remote device(s) with which the local device is engaged in the call. For example, the call manager may receive one or more downlink audio signals from each of the remote devices. In one aspect, the call manager may mix the downlink signals into (at least one) downlink audio signal (e.g., via matrix mixing operations). In addition, the call manager may receive a microphone signal (e.g., which may include speech of the local user) from the microphone 23, and may transmit the microphone signal to each remote device as an uplink audio signal. In some aspects, when the local device includes two or more microphones, the call manager may transmit a sound-pickup beamformer signal that includes sound of a directional beam pattern.

The joint media playback session manager 47 is configured to initiate the joint media playback session between the local device and one or more remote devices in which both devices independently stream media content for synchronous playback. For instance, in response to receiving instructions to initiate the session, the playback session manager may transmit a request to the media content sever to initiate the session, as described herein. In particular, a media application executing within the local device may transmit instructions to the session manager in response to receiving user input (e.g., based on a user selecting a play button in the media application, as illustrated in FIGS. 3 and 4). In another aspect, the session manager may request user authorization before initiating the session. For instance, once a user initiates media playback in a media application, the session manager may provide a notification (e.g., a pop-up notification displayed on display screen 25) requesting for user authorization to initiate a joint media playback session with (at least some of) the participants of the call. When user-authorization is received (e.g., by receiving a user selection of a UI item within the pop-up notification), the session manager may process to request initiation of the session, as described herein.

In one aspect, the joint media playback session manager 47 is configured to receive media content data (e.g., once the session has been initiated). In this case, the session manager is receiving at least one audio signal (or audio channel) associated with the media content. For example, the received audio signal may be associated with a musical composition of which the local user has requested playback, as illustrated in FIG. 3. In one aspect, the session manager may receive two or more audio signals of a piece of media content. For instance, when streaming a musical composition from the media content server, the session manager may receive two audio channels (e.g., left and right channels of a stereophonic recording of the musical composition). In another aspect, the session may receive two or more audio channels, such as for example the entire audio soundtrack of a movie in 5.1-surround format.

The speech DSP 41 is configured to receive the downlink audio signal from the call manager and is configured to perform speech processing operations upon the signal. In one aspect, the speech DSP may perform a noise reduction algorithm upon the downlink signal to reduce (or eliminate) noise contained therein (e.g., in order to produce a speech signal that mostly contains speech of remote users). In one aspect, to process the signal the algorithm may apply a high-pass filter since most noise (or non-speech noise) may be low-frequency content. In another aspect, to process the signal the algorithm may improve its signal-to-noise ratio (SNR). To do this, the speech DSP may spectrally shape the downlink signal by applying one or more filters (e.g., a low-pass filter, a band-pass filter, a high-pass filter, etc.) upon the signal. As another example, the DSP may apply a scalar gain value to the signal. In one aspect, the speech DSP may perform any method to process the downlink signal to reduce noise contained therein.

The VAD 42 is configured to receive the (e.g., processed) downlink audio signal, and is configured to perform voice activity detection (or speech detection) operations to detect a presence (or absence) of a user's voice (speech) contained therein. For instance, the VAD may determine whether (at least a portion of) spectral content of the downlink signal is associated with human speech. In another aspect, the VAD may determine a presence of speech based on whether a signal level of the downlink signal exceeds a threshold. In some aspects, the VAD may use any method to determine whether there is a presence of speech within the signal. The VAD is configured to generate an output based on the downlink signal. In particular, the VAD may generate a VAD signal which indicates whether or not speech is contained within the downlink signal. For example, the VAD signal may have a high signal level (e.g., one) when the presence of speech is detected, and may have a low signal level (e.g., zero) when speech is not detected (or at least not detected within a threshold level). In another aspect, the VAD signal need not be a binary decision (speech/non-speech); it could instead be a speech presence probability according the scalar gain is to be adjusted, as described herein. In some aspects, the VAD signal may also indicate the signal level (e.g., sound pressure level (SPL)) of the detected speech.

As described herein, the VAD may receive a mix of two or more downlink audio signals (e.g., mixed by the call manager 46), each downlink signal received from a remote device that is engaged in a (e.g., conference) call with the local device. In one aspect, the VAD may receive each separate downlink signal to determine whether at least one of the downlink signals contains speech. Once speech is detected in at least one of the downlink signals, the VAD may generate the VAD signal to indicate the detection of speech. In some aspects, the speech DSP may process each individual downlink signal before received by the VAD.

In another aspect, in addition to (or in lieu of) generating the VAD signal, the local device may optionally receive a VAD signal from (e.g., at least one of) the remote device(s). Specifically, each remote device may include its own VAD and may be configured to generate a VAD signal as output of the VAD that indicates whether or not at least one microphone signal produced by a microphone of the remote device (and/or their uplink signals transmitted to the local device 2 during the call) includes active speech of the remote user. Once generated, each remote device may transmit the VAD signal over the network 4 to the local device. Once received, the scalar gain 43 may apply a scalar gain value upon the audio signal of the media content based on the received VAD signals(s) from the remote device(s).

The scalar gain 43 is configured to receive the audio signal from the joint media playback session manager 47 and the VAD signal from the VAD 42 (and/or from at least one remote device), and is configured to process the audio signal based on the VAD signal. In particular, the scalar gain is configured to adjust (e.g., at least a portion of) the signal level of the audio signal by applying one or more scalar gain values based on whether the VAD signal indicates that the presence of speech is detected within the downlink audio signal. In particular, the gain adjustment may reduce a volume level of the audio signal of the media content associated (e.g., being streamed by) the joint media playback session. In one aspect, the applied scalar gain value may be a predefined value. In another aspect, the value may be based on the VAD signal. For example, as described herein, the VAD signal may indicate a signal level of the downlink audio signal (or more specifically, a signal level of speech contained therein). In which case, the scalar gain may be configured to adjust the applied scalar gain value based on the signal. For example, when the speech detected in the downlink audio signal is at a determined signal level, the scalar gain may apply the gain value to reduce the signal level of the audio signal to below that of the determined signal level of the downlink signal in order to ensure that the sound of the media content is lower than the speech within the call.

The mixer 44 is configured to receive the processed audio signal from the scalar gain 43 and the processed downlink audio signal from the speech DSP 41, and is configured to perform matrix mixing operations, for example, in order to produce a mix of the two signals. The controller may use the mixed signal to drive the speaker 22 to playback sound of the call, as well as the media content of the playback session. In another aspect, the mixer may receive one or more unprocessed downlink audio signals. For example, the mixer may receive the downlink audio signal from the call manager 46, rather than receiving the processed downlink audio signal from the speech DSP 41.

In one aspect, the controller may optionally have an additional DSP 45, which may be configured to perform one or more audio signal processing operations upon the mix. For example, the additional DSP may perform at least some of the operations described herein, such as spatially rendering the mix (e.g., by applying spatial filters, such as head-related transfer functions (HRTFs) to produce binaural audio signals for driving one or more speakers (e.g., a left speaker and a right speaker), as described herein. The controller 20 may then use the processed mix to drive the speaker 22, as described herein. Thus, the controller may perform the operations described herein to reduce the volume level of the media content in response to determining that the remote user has begun to (and/or is actively) speaking during the call with the local user.

As described thus far, the controller 20 applies the scalar gain in response to detecting the presence of voice (or speech) included within one or more downlink signals from one or more remote devices. In another aspect, the determination may be based on whether a local user of the local device is speaking. Specifically, the VAD signal generated by the VAD may indicate whether one or more remote users and/or the local user is speaking. To determine this, the speech DSP 41 may optionally obtain the microphone signal produced by microphone 23 to perform noise reduction operations as described herein. The VAD may receive the processed downlink audio signal and/or the processed microphone signal from the speech DSP 41, and may generate the VAD signal based on either (or both) signals. As a result, the local device may reduce the signal level of the audio signal of the media content when either the local user or the remote user is speaking.

In one aspect, when the media content includes two or more audio signals, the controller may perform at least some of the operations for at least one of the audio signals. For instance, when the media content includes two audio channels for a stereoscopic recording, the controller 20 may perform at least some of the operations for both audio channels in order to lower the signal levels of each audio channel being output by two or more speakers of the local device.

In some aspects, the controller 20 may process the audio signal of the media content while the VAD signal indicates that the downlink signal includes remote active speech. Specifically, the scalar gain 43 may continue to apply a scalar gain value while the VAD signal indicates that there is speech (e.g., so long as the remote or local user is talking). Once the VAD signal indicates speech is no longer present, the controller may cease applying the scalar gain 43, in which case the audio signal may pass into the mixer 44 without a scalar gain adjustment. In one aspect, once speech is no longer present, the applied scalar gain value may be gradually reduced in order to gradually increase the signal level of the audio signal.

Figure 6:
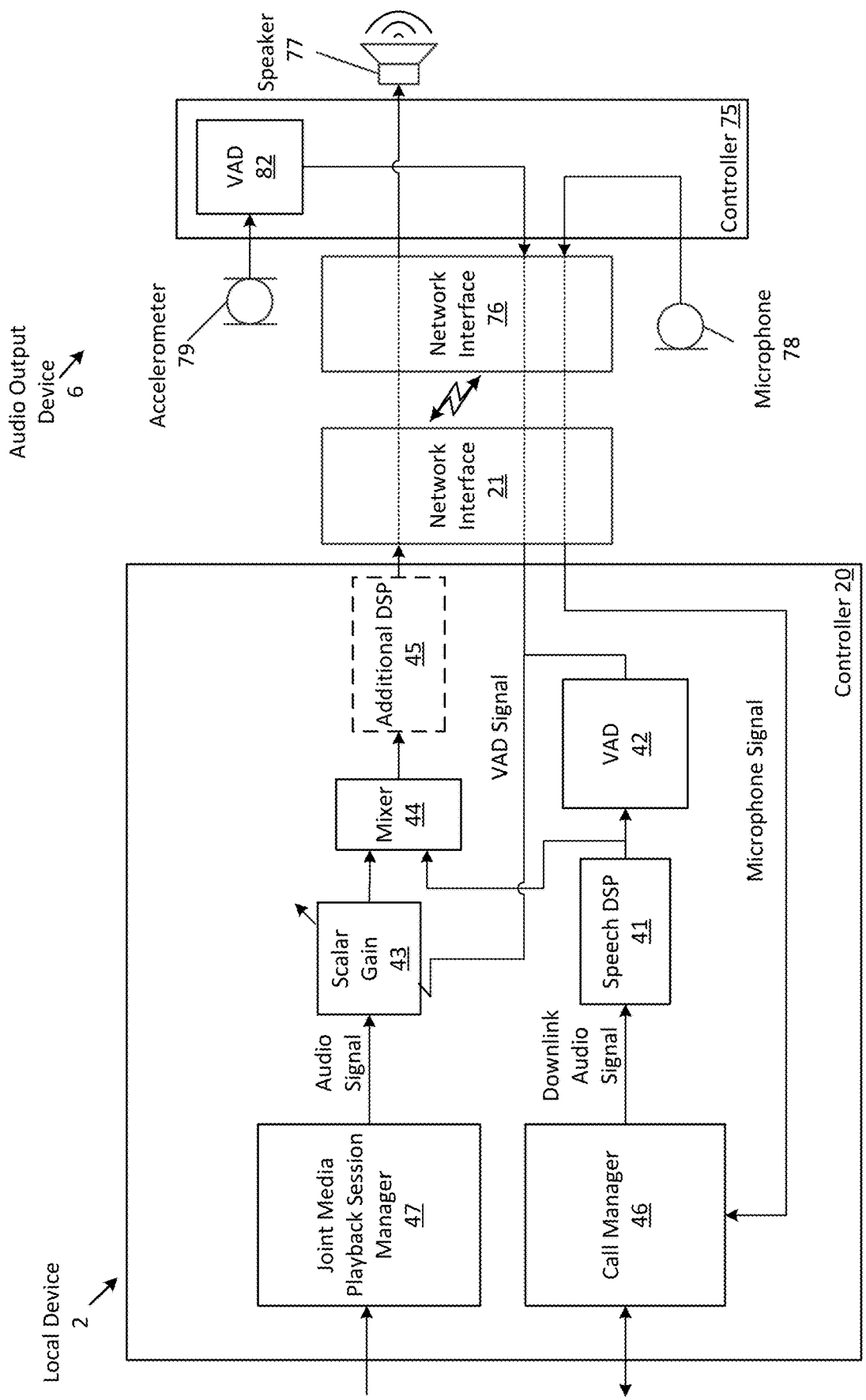
FIG. 6 shows a block diagram of the local device that performs audio signal processing operations upon the audio signal of the media content based on whether speech is detected by an audio output device according to one aspect.

FIG. 6 shows a block diagram of the local device 2 that performs audio signal processing operations upon the audio signal of the media content based on whether speech is detected by an audio output device 6 according to one aspect. Specifically, this figure illustrates that the local device is communicatively coupled with the audio output device to conduct a (e.g., "hands-free") call and the joint media playback session as described in FIG. 5. For instance, both devices may be connected via a bi-directional wireless audio connection (e.g., according to HFP protocol) in which both devices exchange audio data of the telephony call and the media content that is being played back during the joint media playback session. For example, the audio output device may be a hands-free device, such as a wireless headset that is configured to transmit a microphone signal produced by microphone 78 to the (e.g., call manager 46 of the) controller 20, which is then transmitting the microphone signal to one or more remote devices as the uplink signal of the call. In addition, the local device is transmitting the (e.g., processed) mix of the audio signal and the (processed) downlink signal via the bi-directional audio connection to the audio output device, which is using the mix to drive the speaker 77 (rather than using the mix to drive speaker 22, as illustrated in FIG. 5).

This figure also illustrates that the scalar gain 43 may apply a gain value based on an output of a VAD 82 of the local device. Specifically, the gain value may be applied in response to the audio output device detecting speech of the local user. For instance, the audio device includes a VAD 82 that is configured to receive an accelerometer signal produced by accelerometer 79, and is configured to generate a VAD signal based on the received signal. In particular, the VAD determines whether an energy level of the accelerometer signal is above an accelerometer signal threshold (or energy threshold), which may be indicative of a user speaking. In response to determining that the energy level is above the energy threshold, the VAD signal may be set to a high signal level, as described herein. Upon generating the VAD signal, the audio output device 6 transmits the signal to the local device 2, which is received by the scalar gain 43 to apply a gain value based on the signal, as described herein.

In one aspect, along with (or in lieu of) the VAD 82 receiving the accelerometer signal, the VAD may (optionally) receive the microphone signal produced by microphone 78 to generate the VAD signal, as described herein. In another aspect, rather than generating the VAD, the audio output device may transmit the accelerometer signal (and/or microphone signal) to the VAD 42 of the local device, which may then use the signal(s) to generate the VAD signal, as described herein. Thus, the (e.g., VAD 42 of the) local device may generate the VAD signal based on the accelerometer signal produced by the accelerometer 79.

Figure 7:
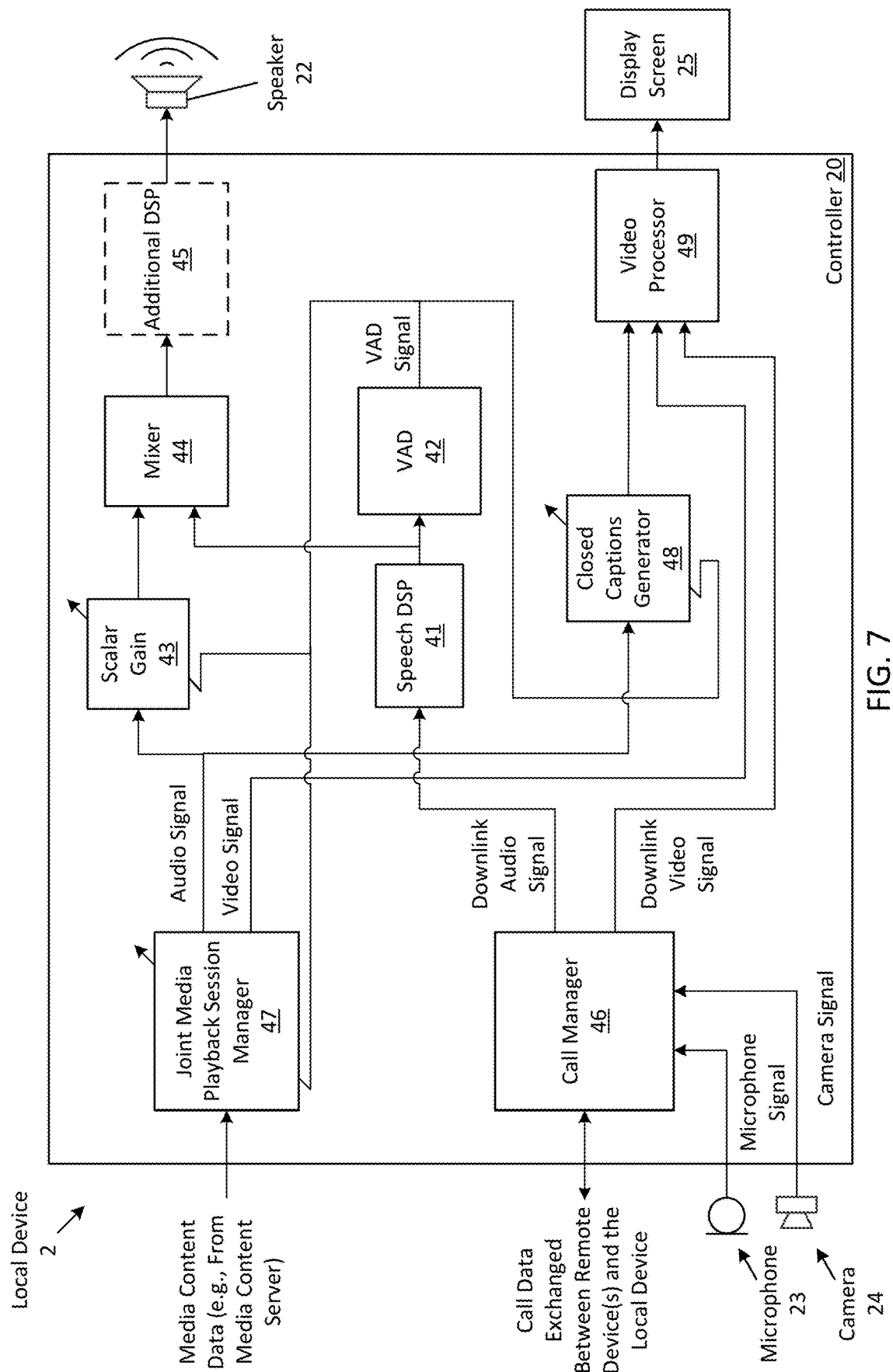
FIG. 7 shows a block diagram of the local device that performs audio signal processing operations based on whether speech is detected within a signal of a video call according to one aspect.

FIG. 7 shows a block diagram of the local device 2 that performs audio signal processing operations based on whether speech is detected within a signal of a video call according to one aspect. Specifically, this figure is showing the controller 20 while performing audio signal processing to process remote active speech and/or perform video processing operations while simultaneously conducting a video call and a joint media playback session with one or more remote devices.

In one aspect, the local device 2 may perform the video call and the joint media playback session, as illustrated in FIG. 4. Specifically, the call manager 46 may be configured to initiate (and conduct) a video call between the local device 2 and one or more remote devices 3. In which case, along with transmitting the microphone signal captured by microphone 23 as an uplink audio signal, the call manager may receive a camera (e.g., video) signal from camera 24, and transmit the video signal as an uplink video signal along with (or in lieu of) the uplink audio signal to remote devices which are participating in the video call. For instance, as described herein, the call manager (e.g., in response to receiving a user request in a telephony or video conference application executing within the local device) may establish a communication session with the remote devices, encode the microphone and camera signals, and transmit the encoded signals (as uplink signals) to the remote devices. Along with transmitting uplink signals, the call manager may receive at least one downlink audio signal and at least one downlink video signal from each remote device participating within the video call for output by the speaker 22 and display screen 25, respectively. In one aspect, any method may be used to initiate and conduct the video call. In some aspects, the joint media playback session manager 47 may be configured to receive media content data including at least one audio signal and at least one video signal associated with a piece of media content. For example, the received audio signal and video signal may be associated with a movie of which the local user has requested playback, as illustrated in FIG. 4.

In one aspect, the controller 20 may perform operations while simultaneously conducting the video call and joint media playback session that are similar to the operations performed by the controller that are described in FIGS. 5 and 6. For example, the (e.g., VAD 42 of the) controller may determine whether the remote user of the remote device begins to speak (and/or is actively speaking) based on the downlink audio signal (e.g., audio content) of the video conference call. In response, the controller may use the scalar gain 43 to apply a scalar gain value in order to reduce a volume level of the audio signal when output by the speaker 22.

In addition, the controller 20 includes additional operational blocks for performing audio signal processing operations and/or video processing operations based on whether speech of a remote user is active. For example, the controller includes a closed captions generator 48 and a video processor 49. The closed captions generator is configured to generate closed captions representing audio content contained within the audio signal of the media content based on the VAD signal output of the VAD 42. In particular, the captions generator may be configured to generate closed captions in response to the controller 20 determining that the downlink signal (or at least one downlink signal) includes speech based on the VAD signal (e.g., the VAD signal having a high signal level indicating that the downlink signal includes speech, as described herein), and may be configured to display the closed captions. Thus, closed captions may be generated and displayed when the remote user begins to (and while the user) speaks. In one aspect, once the VAD signal indicates that the downlink signal no longer includes speech, the captions generator may cease to generate and display closed captions. In another aspect, the closed captions generator may continue to generate and display closed captions for a period of time after the remote user stops speaking.

In another aspect, the closed captions generator 48 may be configured to generate closed captions for display in response to determining that the output sound level of the local device is below a threshold level. For example, the captions generator may determine whether the local user has reduced the volume of the local device (e.g., detecting whether the user has reduced the volume by adjusting a volume control of the local device). If so, the captions generator may automatically generate and display captions. In another aspect, the captions may be displayed based on the signal level of the audio signal associated with the media content. For example, the captions generator may generate and display captions in response to the processed audio signal of the media content by the scalar gain having a signal level that is below a threshold.

In one aspect, to generate the closed captions, the closed captions generator is configured to receive, from the session manager 47, the audio signal associated with the media content that is being streamed during the session, and may be configured to generate the captions based on the audio content contained therein. In some aspects, the generator may perform a speech-to-text algorithm that to identify the speech included within the audio signal and may generate a textual representation of the identified speech. Thus, the captions may include a transcription of the audio content. In another aspect, the captions may include a textual description of non-speech audio, such as a description of a current scene. In another embodiment, rather than generating the captions, the captions may be obtained from the media content data. In which case, the captions generator may receive the captions from the session manager. In some aspects, the captions generator may generate captions using any method.

In one aspect, the video processor 49 is configured to receive image data, such as the downlink video signal from the call manager 46, the video signal from the session manager 47 and (optionally) the closed captions from the captions generator 48 (e.g., when the VAD signal indicates active remote speech), and is configured to render the data for display on the display screen 25 in order to playback the media content during the video call (e.g., as illustrated in FIG. 4). For example, the video processor may overlay closed captions upon the displayed video signal of the media content. In some aspects, the video processor may perform other video processing operations upon one or more of the video signals, such as image resizing, image compositing, etc.

In one aspect, the controller may adjust playback of the media content based on whether remote active speech is detected by the VAD 42. Specifically, once remote speech is determined to be no longer active (e.g., by the VAD), the joint media playback session 47 may rewind the media content to a moment before the active speech was originally detected. For example, the joint media playback session manager may receive the VAD signal from the VAD 42 and determine a first timestamp along a playback duration of the media content at which the VAD signal begins to indicate that the downlink signal includes speech (e.g., a moment at which the VAD signal transitions from a low signal level to a high signal level). At this point, a remote user and the local user may have begun a conversation. Once that conversation concludes, the media content may be rewound to begin playback at (or before) the first timestamp along the playback duration. For instance, once the session manager determines a second subsequent timestamp at which a determination is made in which the VAD signal indicates that the downlink signal has ceased to include speech (e.g., a moment at which the signal level of the VAD transitions from a high signal level to a low signal level), the session manager may pause playback of the media content (at or after the second timestamp). In one aspect, pausing video playback may include pausing the display of the media content at a moment along the playback duration. In addition, the audio playback of the audio signal may be paused by ceasing to drive the speaker 22 with the mix of the downlink signal and the audio signal. In another aspect, the audio playback of the audio signal may be paused, while playback of the downlink audio signal may continue. In which case, once a determination that the audio playback is to be paused, the mixer 44 may cease mixing both signals, and may pass through the downlink signal for use to drive the speaker 22. Thus, the local user and remote user may engage in a conversation and when completed may continue experiencing playback of the media content.

In one aspect, the playback adjustment may occur across at least some of the remote devices which are engaged in the call and the joint media playback session with the local device. For example, the controller 20 may transmit a control signal to remote devices instructing the devices to rewind playback to a moment along the playback duration, in response to the remote speech no longer being active.

Figure 8:
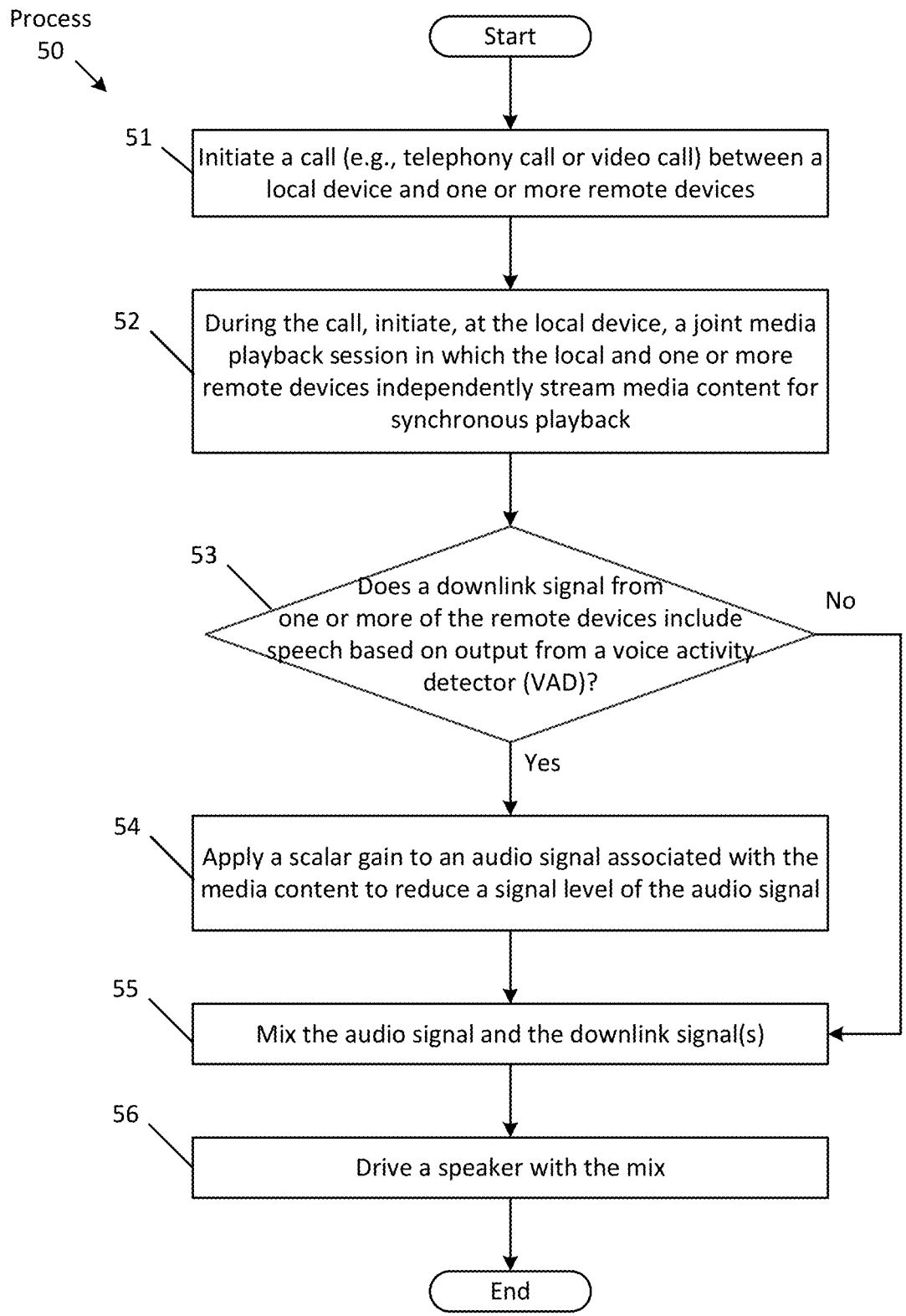
FIG. 8 is a flowchart of one aspect of a process for processing an audio signal of the media content based on whether speech is detected within the downlink audio signal.
Figure 9:
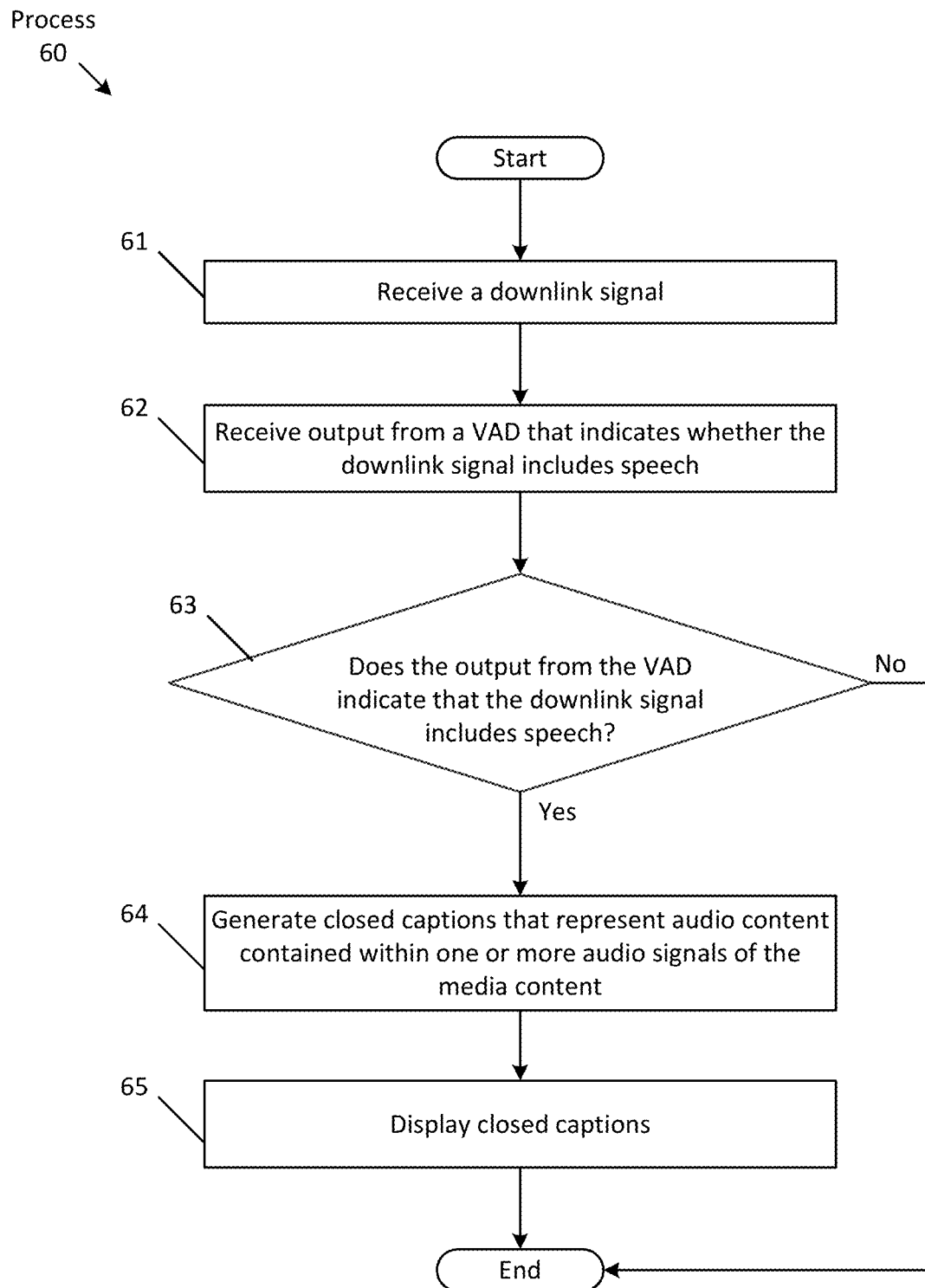
FIG. 9 is a flowchart of one aspect of a process for displaying closed captions representing audio content of the media content.
Figure 10:
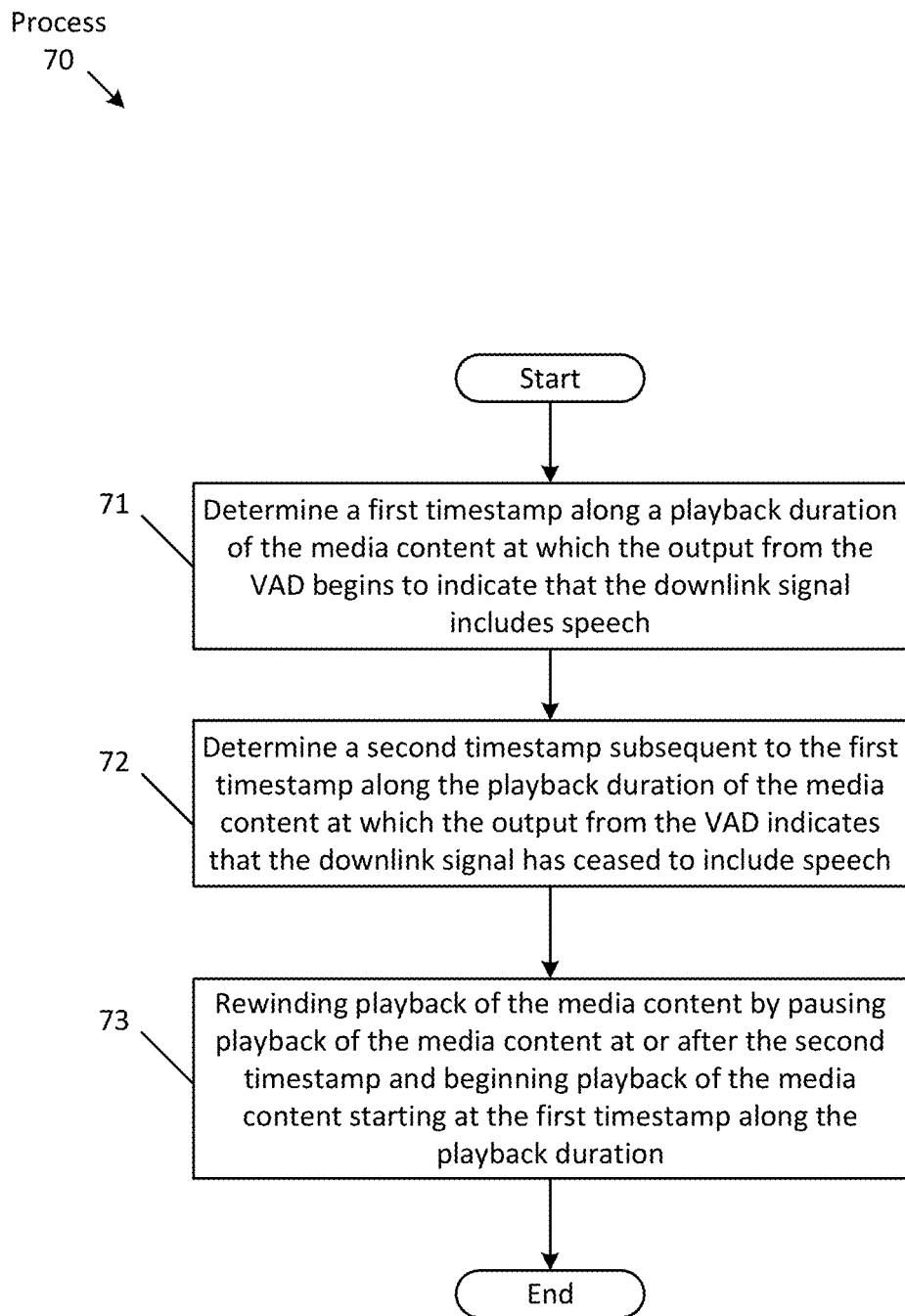
FIG. 10 is a flowchart of one aspect of a process for rewinding playback of media content upon a determination that the downlink audio signal has ceased to include speech.

FIGS. 8-10 are flowcharts of processes 50, 60, and 70, respectively, for performing one or more operations in response to detecting remote active speech. In one aspect, the processes may be performed by one or more devices of the audio system 1, as illustrated in FIG. 1. For instance, at least some of the operations of these processes may be performed by (e.g., controller 20 of) the local device 2 and/or by (e.g., controller 75 of) the audio output device 6.

Regarding FIG. 8, this figure is a flowchart of one aspect of a process 50 for processing an audio signal of the media content based on whether speech is detected within the downlink audio signal. The process 50 begins by the controller 20 initiating a call (e.g., a telephony call or a video call) between the local device 2 and one or more remote devices 3 (at block 51). As described herein, the call may be initiated by the call manager 46 in response to receiving a request by the local user. In one aspect, the initiation of the call may be in response to receiving an incoming call from one or more remote devices. In which case, the call may be initiated by the call manager in response to the user accepting the call (e.g., via a user selection of a UI item of a telephony application for picking up a call that is displayed on display screen 25 when an incoming call signal is received from a remote device).

During the call, the controller 20 initiates, as the local device 2, a joint media playback session in which the local device and one or more remote devices independently stream media content for synchronous playback (at block 52). For example, the joint media playback session manager 47 may initiate the playback based on user input. In one aspect, the playback session may be between all of the devices that are conducting the call. In another aspect, the playback session may be initiated between the local device and at least some of the remote devices. In which case, when initiated the local user may define which remote devices are to participate. In some aspects, initiating the joint media playback session may be in response to the controller 20 receiving a initiation request from one or more of the remote devices and/or the media content server 5.

As described herein, once initiated, the controller 20 may receive at least one audio signal and/or at least one video signal associated with the media content, and may be configured to playback the media content and output the downlink audio signal and/or the downlink video signal simultaneously, as described herein.

The controller 20 determines whether the downlink signal from one or more of the remote devices includes (e.g., remote active) speech based on output from a VAD, such as VAD 42 of controller 20 and/or VAD 82 of the audio output device 6 (at decision block 53). Specifically, the controller may determine whether the VAD signal is at a high signal level, which may occur when the remote user begins to speaker or has already begun to speak. If so, the controller 20 applies a scalar gain to an audio signal associated with the media content to reduce a signal level of the audio signal (at block 54). For instance, upon detecting speech, the controller may apply scalar gain 43 to the audio signal from the session manager 47. The controller 20 mixes the (gain adjusted) audio signal and the downlink signal(s) (at block 55). The controller 20 drives a speaker with the mix (at block 56). In one aspect, the speaker may be a part of the local device, such as speaker 22. In another aspect, the speaker may be a part of a separate electronic device that is communicatively coupled with the local device, such as speaker 77 of the audio output device 6.

FIG. 9 is a flowchart of one aspect of the process 60 for displaying closed captions representing audio content of the media content. In one aspect, this process may be performed while the local device 2 and one or more remote devices 3 are conducting a call and a joint media playback session simultaneously, as described herein. The process 60 begins by the controller 20 receiving a downlink signal (at block 61). The controller receives output from a VAD (e.g., VAD 42) that indicates whether the downlink signal includes speech (at block 62). The controller determines whether the output from the VAD indicates that the downlink signal include speech (at decision block 63). Specifically, the controller determines whether the user of the remote device begins (or has already begun) to speak. If so, the controller generates closed captions that represent audio content contained within one or more audio signals of the media content (at block 64). The controller then displays the closed captions (at block 65). Thus, in response to determining that the remote user is speaking, the local device 2 displays the closed captions on the display screen 25.

FIG. 10 is a flowchart of one aspect of the process 70 for rewinding playback of media content upon a determination that the downlink audio signal has ceased to include speech. The process 70 begins by the controller 20 determining a first timestamp along a playback duration of the media content at which the output from the VAD begins to indicate that the downlink signal includes speech (at block 71). The controller 20 determines a second timestamp subsequent to the first timestamp along the playback duration of the media content at which the output from the VAD indicates that the downlink signal has ceased to include speech (at block 72). Specifically, the first timestamp may be determined in response to determining that the VAD signal produced by the VAD is at a high signal level, and the second time stamp may be determined in response to determining that the VAD signal goes from the high signal level to a low signal level. The controller 20 rewinds playback of the media content by pausing playback of the media content at or after the second timestamp and beginning playback of the media content starting at (or before) the first timestamp along the playback duration (at block 73).

Some aspects may perform variations to the processes 50, 60, and/or 70 described in FIGS. 8-10. For example, the specific operations of at least some of the processes may not be performed in the exact order shown and described. The specific operations may not be performed in one continuous series of operations and different specific operations may be performed in different aspects. For example, in FIG. 8, the joint media playback session may be initiated before the initiation of the call. In which case, a local user may select (e.g., within a UI of a media application, such as the media applications displayed in FIGS. 3 and 4) the media content for playback and select one or more remote devices (e.g., selecting contact information, such as telephone numbers, associated with the remote devices). Once selected, the local user may initiate playback by selecting a play button, as shown in FIGS. 3 and 4, for example.

In addition, the controller 20 may perform one or more of the operations in response to detecting remote active speech. For instance, upon detecting that remote speech has begun, the controller 20 may perform the operations in processes 50 and 60 in order to reduce the volume level of the audio signal and display closed captions.

In one aspect, the controller 20 may cease performing at least some of the operations described in processes 50, 60, and/or 70 in response to the output of the VAD indicating that the downlink signal does not include speech. For instance, upon the output of the VAD indicating that speech is not within the downlink signal, the controller may stop applying the scalar gain to the audio signal at block 54 of FIG. 8. As a result, the sound level of the media content may be restored to a previous level from before the reduction of the volume level (e.g., before speech of the remote user was detected). Similarly, the controller may cease to generate and display closed captions at blocks 64 and 65 once remote speech is no longer determined to be active.

In one aspect, the operations performed by the controller to preserve audio quality of the media content based on a detection of remote active speech may be automatic (e.g., without user intervention). For example, the closed captions generator 48 may generate and display captions automatically based on output of the VAD, as described in process 60. In another aspect, at least some of the operations (e.g., the adjustment to the signal level of the audio signal by the application of the scalar gain, the generation and displaying of closed captions, and/or the rewinding of playback, etc.) may be performed in response to receiving user authorization. In particular, in response to determining that output of the VAD indicates that the downlink signal has ceased to include speech, the controller may provide a notification to the local user requesting authorization to perform at least one of the operations described herein. For example, upon determining the second timestamp at which remote speech is no longer at block 72 of process 70, the controller may provide a notification to the user, requesting authorization to rewind playback at block 73. In one aspect the notification may be a pop-up notification that is displayed on the display screen 25. Once authorization is received (e.g., by the user selecting a UI item), the controller may perform at least one of the operations described herein. In another aspect, if user authorization is not received (e.g., within a period of time), the controller may abstain from performing at least some of the operations described herein. For instance, if authorization is not received to rewind playback, the controller may continue playback of the media content after the period of time.

As described herein, operations performed by the controller to preserve media quality of media content playback (e.g., the application of the scalar gain, the generation and display of closed captions, and/or the rewinding of the playback of the media content, etc.) may be based on whether there is remote active speech during a concurrent call. In addition, at least some of the operations may be performed in response to the controller determining that there is local active speech. For example, the controller 20 may apply the scalar gain to the audio signal in response to determining that output of a VAD indicates that either 1) a microphone signal produced by a microphone of the local device or an audio output device includes speech of a local user and/or 2) an accelerometer signal produced by an accelerometer includes has an energy level that is indicative of speech.

As described thus far, the operations performed by the controller to preserve audio quality of the media content may be in response to detecting remote and/or local active speech. In other words, the operations may be performed when the local or remote users are talking. In another aspect, at least some of the operations to preserve audio quality may be performed in response a signal level of the downlink signal and/or a noise level of a microphone signal produced by a microphone coupled to the local device, such as microphone 23 exceeding a threshold level. Specifically, the operations may be performed when there is a loud sound occurring either at the remote device or the local device. Thus, for example, in response to the downlink signal or the microphone signal exceeding a signal level, the controller may generate and display closed captions, as described in process 60. In addition, when the noise subsides (e.g., the signal level dropping below the threshold), the controller 20 may rewind playback, as described in process 70.

Streaming media content, such as musical compositions, movies, etc., while using an audio output device (e.g., wireless headphones) that is wirelessly connected to a media source device, requires that the source device transmit a high-quality audio stream over the wireless connection to the audio output device for output (e.g., to drive one or more speakers) in order to provide a good listener experience. To stream high-quality audio, most wireless headphones establish a uni-directional wireless audio connection that supports a high bit rate and sampling rate with the source device. For example, both devices may establish a BLUETOOTH connection using a wireless profile that provides high quality audio, such as A2DP. A2DP allows for stereo audio to be streamed from the source device to the wireless headphones, and uses the SBC codec at a sampling rate up to 48 kHz.

Some audio output devices may be unable to support high-quality audio when communicating with a source device that has initiated a call with another device and has initiated a joint media playback session in order to stream media content. For example, to allow wireless communication between an audio output device and a source device, both devices may establish a bi-directional wireless audio connection to exchange audio signals associated with the call. These bi-directional wireless audio connections, however, only provide a low-quality audio stream to the audio output device. For example, both devices may establish a BLUETOOTH connection using a wireless profile that allows audio data to be exchanged between multiple devices, such as HFP or HSP. These profiles only support "voice-quality" or low-quality audio to be exchanged between both devices. For instance, HFP traditionally only uses codecs that have a sampling rate of 8 to 16 kHz, and are only capable of transmitting mono audio signals. Although such a low-quality stream may be sufficient for voice-only communication, such a wireless connection may not provide sufficient audio quality when streaming media content along with conducting a call. In one aspect, other audio output devices, however, may be designed to support high-quality audio wireless transmission. For example, an audio output device may support a "high-quality" bi-directional wireless audio connection using a wireless profile that has a codec with a higher sampling rate (e.g., 24 kHz). Therefore, there is a need for switching between wireless audio connections when initiating a joint media playback session during a call based on the capabilities of an audio output device.

To overcome these deficiencies, the present disclosure describes a method and audio system for switching wireless audio connections during a call. Specifically, the method may be performed by the local device 2 that is communicatively coupled to the audio output device 6 (e.g., in hands-free communication). For example, while engaged in a call (e.g., a telephony call or a video call) with a remote device, the local device communicates with the audio output device via a bi-directional wireless audio connection. The local device determines that a joint media playback session has been initiated in which the local device and the remote device are to independently stream media content for separate playback by both of the devices while engaging in the call. The local device switches to communicate with the wireless headset via a uni-directional wireless audio connection based on a determination of one or more capabilities of the audio output device (e.g., determining that the output device only supports a low-quality audio stream), where a mix of 1) one or more signals associated with the call and 2) an audio signal of the media content is transmitted to the wireless headset over the uni-directional wireless audio connection. As a result, the audio output device may provide high-quality audio when engaged in both a call and a joint media playback session.

Figure 11:
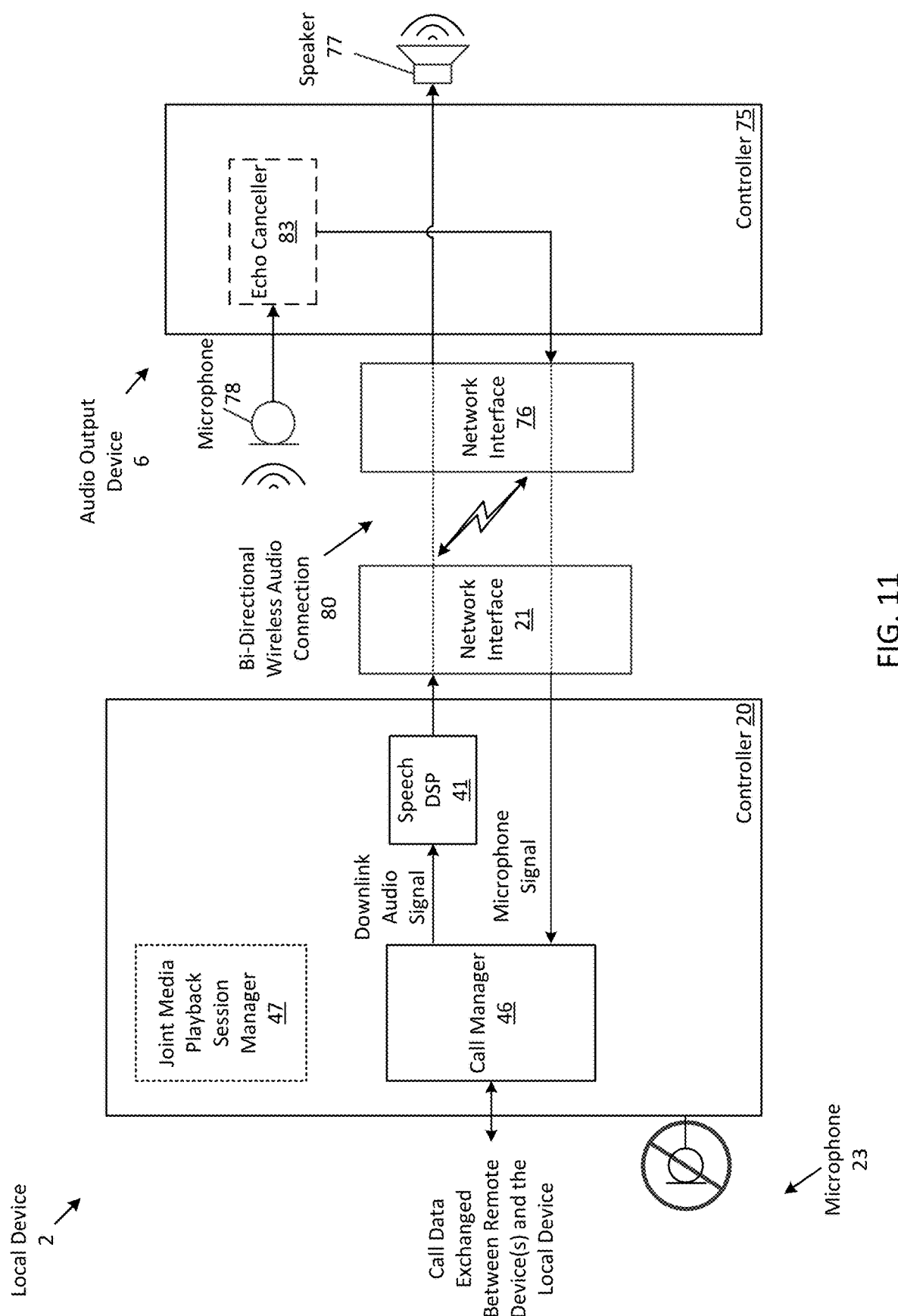
FIG. 11 shows a block diagram in which the local device 2 that is communicatively coupled via a bi-directional wireless audio connection with audio output device 6 for exchanging audio data while the local device is engaged in a call with a remote device 3 according to one aspect.

FIG. 11 shows a block diagram in which the local device 2 that is communicatively coupled via a bi-directional wireless audio connection with audio output device 6 for exchanging audio data while the local device is engaged in a call with a remote device 3 according to one aspect. Specifically, this figure illustrates that the local device is communicating with the audio output device via a bi-directional wireless audio connection, while engaged in a (e.g., hands-free) call with a remote device in order to exchange audio data of the call is exchanged between the local device and the audio output device. This is illustrated by the microphone 23 of the local device be deactivated (e.g., shown as being strikethrough) and the microphone 78 of the audio device capturing sound (e.g., as shown by sound waves). In one aspect, this figure shows both devices before (or after) a joint media playback session has been initiated.

As shown, both devices are communicatively coupled via a bi-directional wireless audio connection 80 that allows both devices to exchange audio data, as described herein. In one aspect, the bi-directional connection may be any type of wireless connection that allows both devices to exchange audio data, such as a HFP connection. In one aspect, the bi-directional connection may be a "low-quality" bi-directional wireless audio connection (low-quality wireless connection) or a "high-quality" bi-directional wireless audio connection (high-quality wireless connection). In one aspect, a low-quality wireless connection may be designed to support mono audio and/or the transmission of an audio stream at a sampling rate that is less than a threshold sampling rate (e.g., 24 kHz). In some aspects, the low-quality bi-directional connection may be a traditional HFP or HSP connection, as described herein. In some aspects, a high-quality audio connection may be designed to support stereo audio and/or the transmission of an audio stream at a sampling rate that is at least the threshold sampling rate. In one aspects, the high-quality audio connection may be a BLUETOOTH connection that uses a wireless profile (e.g., HFP) with a codec that is designed to transmit a stereo audio stream at or above the threshold sampling rate.

In one aspect, the audio quality of the wireless connection may be based on the capabilities (or characteristics) of the audio output device (and/or the local device). For example, during initiation of the bi-directional wireless audio connection, the audio output device may transmit device characteristics to the local device. In one aspect, the characteristics may indicate what types of wireless audio connections the audio output device may establish with the local device. For example, the characteristics may indicate which wireless profiles and/or audio codecs the audio output device supports. In one aspect, based on these characteristics, the local device may establish the bi-directional wireless audio connection.

To conduct the hands-free communication, both controllers 20 and 75 of the local device and audio output device, respectively, include one or more operational blocks. For example, controller 20 includes the audio call manager 46 and the speech DSP 41, and controller 75 includes an (optional) echo canceler 83. The controller 20 also includes the media playback manager 47, but since both devices are not conducting a joint media playback session, this operational block is inactive (as shown by having dotted boundaries).

As described herein, the audio call manager is configured to initiate (and conduct) a call (e.g., by exchanging audio data of the call) between the local device 2 and one or more remote devices 3. Specifically, the manager receives a downlink audio signal from the remote device and transmits a microphone signal received from the audio output device as an uplink audio signal to the remote device. The speech DSP 41 is configured to receive the downlink audio signal from the audio call manager, and is configured to perform audio signal processing (e.g., speech processing) operations upon the signal in order to reduce (or eliminate) noise contained therein. As described herein, the speech DSP may apply noise reduction to the downlink audio signal associated with the call. The audio output device transmits the (processed) downlink audio signal over the bi-directional wireless audio connection 80 (via network interfaces 21 and 76), to the audio output device to drive the speaker 77.

In one aspect, the audio output device may include an optional echo canceller 83 is configured to receive a microphone signal captured by the microphone 78, and is configured to perform echo cancellation operations in order to cancel linear echo from the microphone signal. Specifically, the canceller may determine a linear filter based on a transmission path between the microphone 78 and the speaker 77, and apply the filter to the downlink audio signal to generate an estimate of echo, which is subtracted from the microphone signal. In some aspects, the echo canceller may use any method of echo cancellation. The (echo cancelled) microphone signal is then transmitted over the bi-directional wireless audio connection 80 to the audio call manager 46 for transmission to the remote device as an uplink audio signal.

Figure 12:
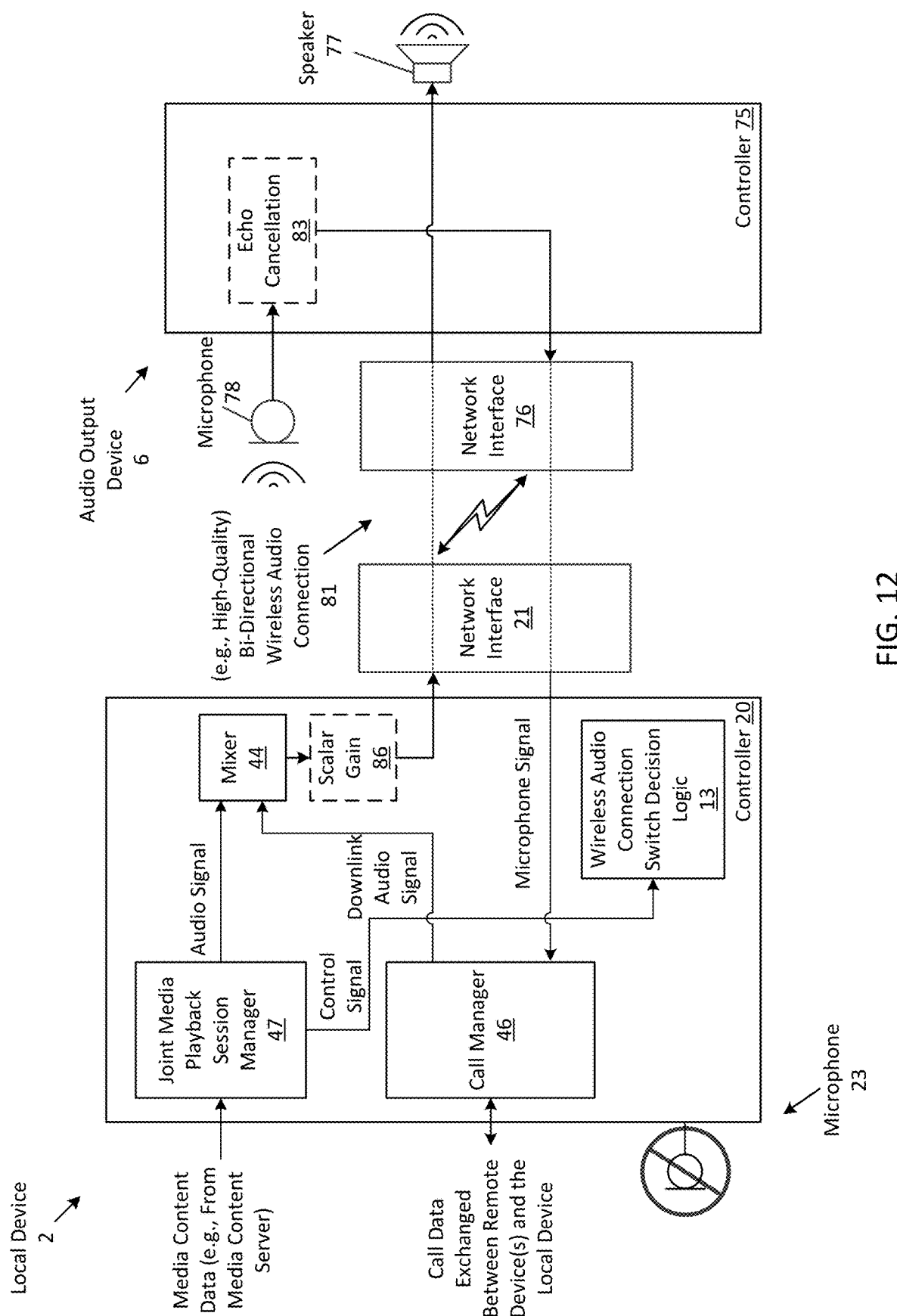
FIG. 12 shows a block diagram in which the local device 2 is communicatively coupled to the audio output device 6 via a bi-directional wireless audio connection during a joint media playback session and a call with the remote device 3 according to one aspect.

FIG. 12 shows a block diagram in which the local device 2 is communicatively coupled to the audio output device 6 via a bi-directional wireless audio connection during a joint media playback session and a call with the remote device 3 according to one aspect. Specifically, this figure illustrates the result of the local device 2 initiating a joint media playback session, while the local device and the audio output devices were engaged in a hands-free call, as shown in FIG. 5. The initiation of the playback session is illustrated by the media playback manager 47 receiving media content from the media content server 5 (e.g., as an audio signal). In one aspect, this figure may be similar to FIG. 6, which describes the local device being communicatively coupled with the audio output device while conducting a hands-free call and the joint media playback session simultaneously. This figure also shows that the controller includes one or more additional operational blocks, such as mixer 44, a wireless audio connection switch decision logic 13, and a scalar gain 86 (which is optional).

In one aspect, the decision logic 13 is configured to determine whether to switch to the uni-directional wireless audio connection or (e.g., maintain) the bi-directional wireless audio connection in order to maximize audio quality of the media content and the call, thereby providing the best user-experience. Specifically, the decision logic determines that a joint media playback session has been initiated by receiving a control signal from the joint media playback session manager indicating that a (e.g., new) media session is (e.g., to be) established between the local device and one or more remote devices. In one aspect, the decision logic determines whether to switch based on the capabilities of the audio output device (e.g., which may have been received during the initialization of the bi-directional wireless audio connection 80), as described herein. For instance, if the audio output device is determined to not support high quality audio through the use of a bi-directional connection (e.g., based on an available audio codec having a sampling rate below the threshold rate, as described herein), the decision logic may switch the wireless connection to a unidirectional connection. More about the uni-directional connection is described in FIGS. 13a and 13b. In this figure, however, the decision logic has determined that the audio output device supports high-quality audio. In which case, the local device has established a (e.g., high-quality) bi-directional wireless audio connection 81 for streaming high-quality audio. In one aspect, this connection may have been established upon initiation of the hands-free call (e.g., in FIG. 11). In which case, once a determination is made that the existing connection (e.g., between the local device and the audio output device during the hands-free call) provides high-quality audio, the local device may maintain the bi-directional connection with the audio output device. As a result, connections 80 and 81 may be the same connection.

In another aspect, rather than receiving characteristics from the audio output device, the decision logic 13 may retrieve one or more characteristics based on the audio output device. Specifically, during initialization of the hands-free call, the audio output device may transmit a device identifier to the local device. The decision logic may use the identifier to perform a table lookup into a data structure that associates characteristics with device identifiers.

In one aspect, upon initiation of the joint media playback session the local device may determine whether to switch to the uni-directional wireless audio connection or (e.g., maintain) the bi-directional wireless audio connection in order to maximize audio quality of the media content and the call, thereby providing the best user-experience. In one aspect, the determination may be based on the capabilities of the audio output device, as described herein. For instance, if the audio output device does not support high quality audio through the use of a bi-directional connection (e.g., based on an available audio codec having a sampling rate below the threshold rate, as described herein), the local device may switch the wireless connection to a unidirectional connection. More about the uni-directional connection is described in FIGS. 13a and 13b. In this figure, however, the local device has determined that the audio output device supports high-quality audio. In which case, the local device has established a (e.g., high-quality) bi-directional wireless audio connection 81 for streaming high-quality audio. In one aspect, this connection may have been established upon initiation of the hands-free call (e.g., in FIG. 11). In which case, once a determination is made that the existing connection (e.g., between the local device and the audio output device during the hands-free call) provides high-quality audio, the local device may maintain the bi-directional connection with the audio output device. As a result, connections 80 and 81 may be the same connection.

In one aspect, while conducting the joint media playback session and the call, the local device may cease performing one or more operations and begin to perform one or more audio processing operations upon the downlink signal of the call and/or the audio signal of the media content. For example, the controller 20 includes the mixer 44 and a scalar gain 86 (which is optional), where the mixer 44 receives an audio signal of the media content from the media playback manager 47 and the downlink audio signal from the call manager 46, instead of the speech DSP 41 receiving the downlink audio signal. In one aspect, the controller may cease performing speech DSP operations (e.g., cease applying the noise reduction upon the downlink audio signal) in response to switching to communicate with the audio output device via the uni-directional connection in order to provide fuller spectral content of both the media content and the audio content of the downlink signal. As described herein, the mixer is configured to perform matrix mixing operations to produce a mix of the signals. The scalar gain 86 is configured to receive the mix, and is configured to apply a scalar gain to the mix in order to reduce a signal level of the mix. In one aspect, the scalar gain may be applied for a period of time after the joint media playback session is initiated (or after the controller 20 switches to communicate with the audio output device via the uni-directional wireless audio connection). After the period of time, the scalar gain may be reduced (or removed) such that the gain is no longer applied to the mix. In one aspect, the scalar gain may be incrementally reduced for a second period of time in order to provide a fading effect. The mix is then transmitted, over the bi-directional wireless audio connection 81, to the audio output device for driving the speaker 77, as described herein.

Figure 13A:
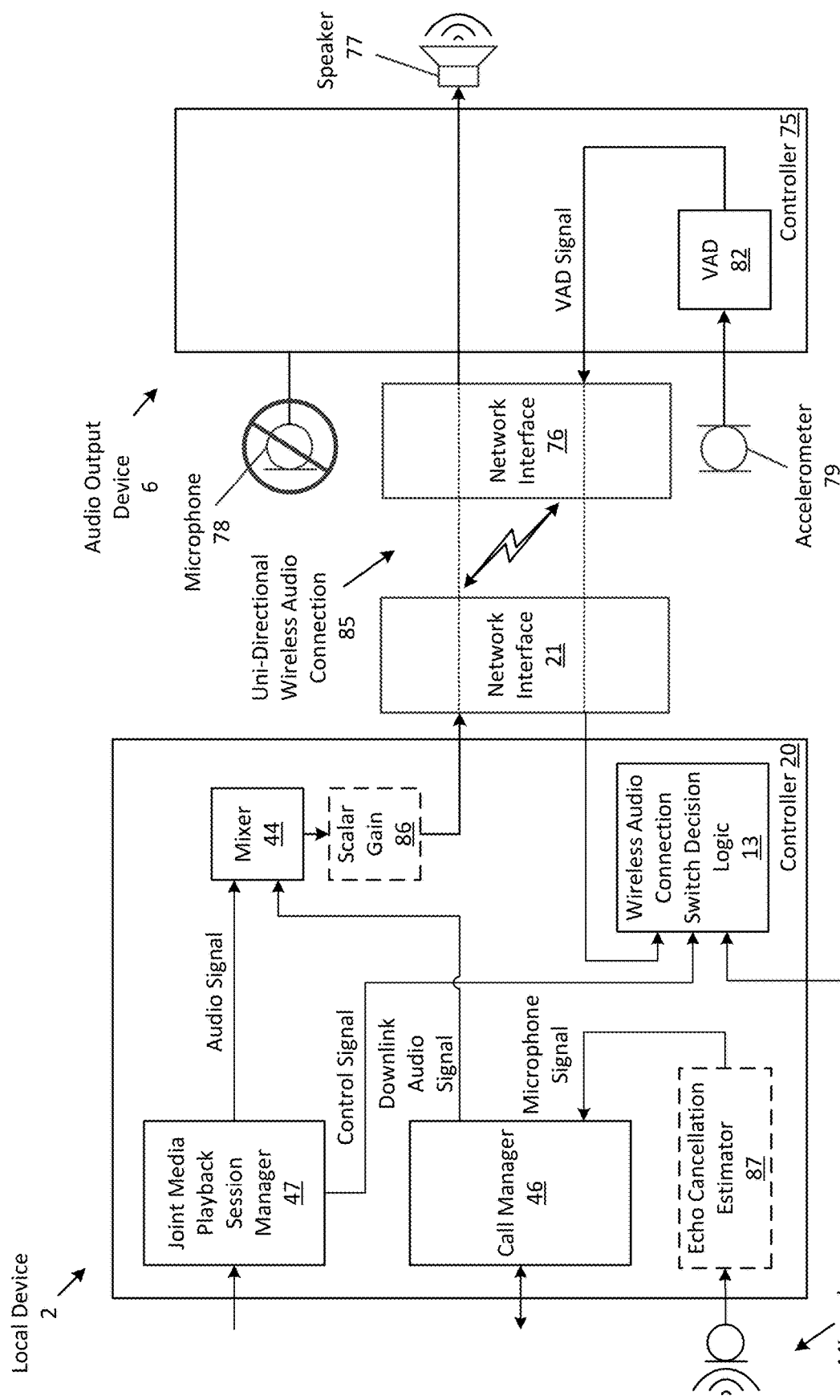
FIGS. 13a and 13b show several block diagrams in which the local device 2 that is communicatively coupled with the audio output device 6 for exchanging audio data switches between wireless audio connections based upon the initiation of the joint media playback session according to one aspect.
Figure 13B:
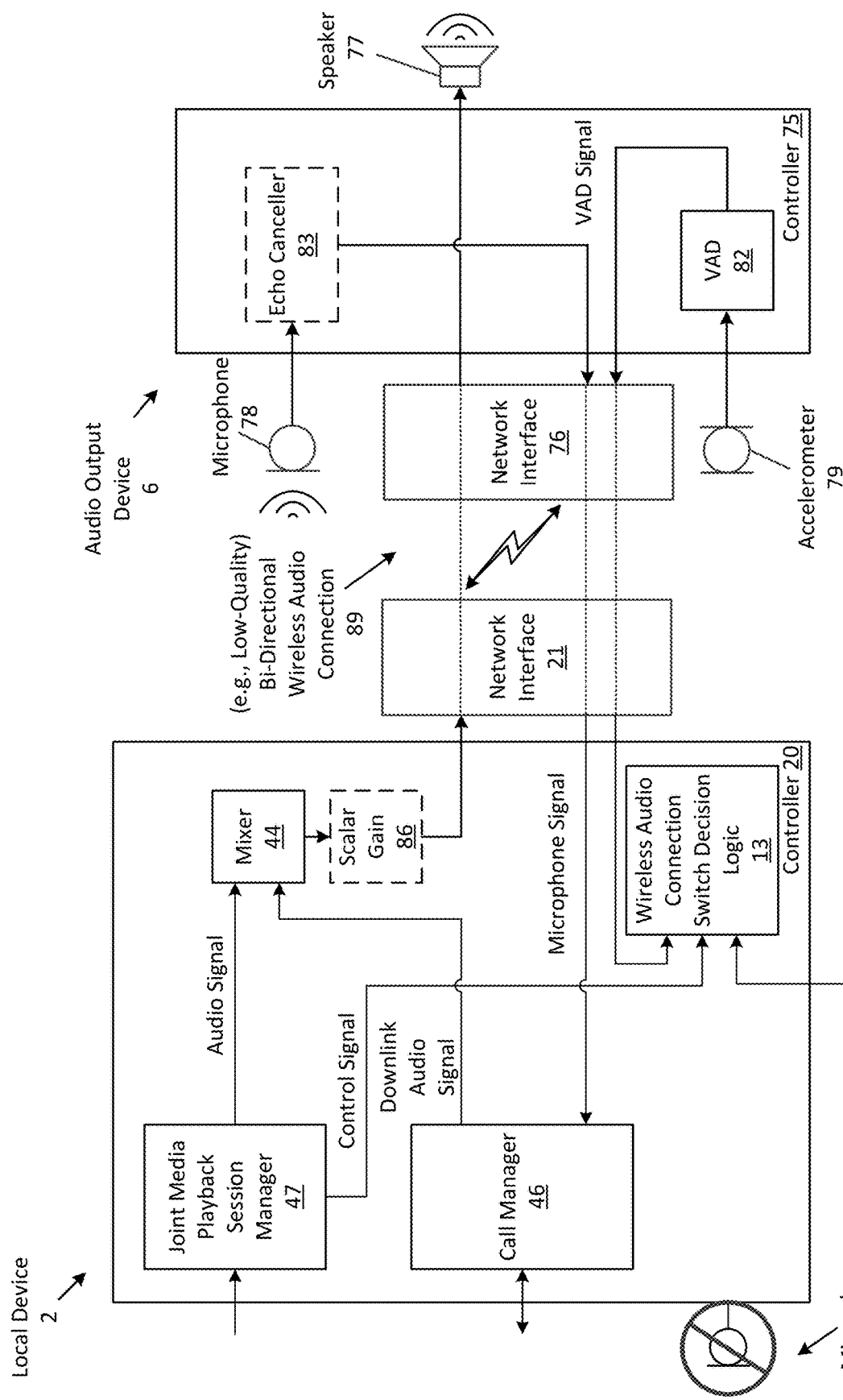

FIGS. 13a and 13b show several block diagrams in which the local device 2 that is communicatively coupled with the audio output device 6 for exchanging audio data switches between wireless audio connections based upon the initiation of the joint media playback session according to one aspect. In particular, FIG. 13a shows a block diagram in which the local device and audio output device are coupled via a unidirectional wireless audio connection 85. Specifically, this figure illustrates the result of the local device 2 initiating a joint media playback session, while engaged in a call. Unlike FIG. 12 in which a bi-directional wireless audio connection is maintained between the local device and the audio output device, however, this figure shows that the local device has switched to a uni-directional wireless audio connection 85 in order to stream high-quality audio data to the audio output device for output (e.g., by speaker 77).

In one aspect, the switch (or transition) from the bi-directional connection to the uni-directional wireless audio connection may be based on the audio output device, as described herein. For example, the decision logic 13 may determine (e.g., in response to receiving the control signal from the session manager 47) that the audio output device does not support exchanging audio signals, via a bi-directional wireless audio connection at a sampling rate that is at least a threshold sampling rate. As described herein, the determination may be based on characteristics received from the audio output device, or based on a table lookup into a data structure using a device identifier. In one aspect, the decision logic may determine to switch to the uni-directional wireless audio connection based on not receiving characteristics from the device and/or not identifying the device within the data structure (e.g., the decision to transition may be a default decision by the decision logic).

In one aspect, the local device 2 and the audio output device may perform one or more operations to transition from the bi-directional connection 80 to the uni-directional wireless audio connection 85. For example, the local device 2 (or the audio output device 6) may tear down (or terminate) the bi-directional wireless audio connection 80. Once torn down, the local device may establish the uni-directional wireless audio connection (e.g., a BLUETOOTH A2DP connection) with the audio output device. In one aspect, since the bi-directional connection is torn down for the uni-directional connection in which audio data may only be transmitted from the local device to the audio output device, the controller may become configured to activate one or more other microphones in order to capture the local user's speech for the uplink audio signal. Specifically, the controller may transmit a signal to the audio output device to mute the microphone 78 (as illustrated by being strikethrough), and may activate the microphone 23 of the local device to captures the local user's voice. In one aspect, the activated microphone may be a part of a different electronic device. Thus, a microphone signal of microphone 23 may be transmitted to the remote device as an uplink audio signal. More about the operations performed by the controller for switching wireless audio connections is described herein.

In one aspect, the controller 20 may (optionally) perform echo cancellation estimation operations upon the microphone signal produced by microphone 23. Specifically, the controller 20 includes an echo cancellation estimator 87 that is configured to perform echo cancellation operations in order to cancel echo from the microphone signal. In one aspect the estimator may perform similar operation as the canceller 83 described in FIG. 11. For instance, the estimator may obtain a microphone signal of the local device that is to be transmitted to the remote device while both devices are engaged in the call. The estimator is configured to generate an estimate of a portion of one or more (e.g., downlink audio) signals associated with the call. For instance, the estimator may determine a linear filter based on a transmission path between the microphone 23 and the speaker 77. In one aspect, unlike the transmission path between the microphone 78 and the speaker 77 which may be defined (e.g., based on both the microphone and speaker being integrated into the audio output device at predefined locations), the transmission path between the microphone 23 of the local and the speaker 77 of the audio output device may not be predefined. Therefore, the estimator may estimate the transmission path. For example, the estimator may determine the distance between the microphone 23 and speaker 77 based on a time of arrival of sound produced by the speaker 77 that is captured by the microphone 23. In another aspect, the estimator may estimate the path based on a received signal strength (RSSI) of the wireless audio connection. In some aspects, the estimator may use any sound localization method to determine the location of the speaker 77 and therefore the path from the speaker to the microphone. In another aspect, the transmission path may be predefined (e.g., a path determined in a controlled environment, such as a laboratory). Using the estimate of the transmission path, the linear filter is determined, which is the applied to the downlink audio signal to generate an estimate of echo, which is subtracted from the microphone signal, as described herein.

In one aspect, the wireless audio connection switch decision logic 13 may be configured to switch between the uni-directional wireless audio connection 85 and a bi-directional wireless audio connection while conducting the joint media playback session and the call. In one aspect, the decision logic may switch to the high-quality bi-directional wireless audio connection (e.g., connection 81 in FIG. 12. In another aspect, when the audio output device does not support a high-quality bi-directional wireless audio connection, the decision logic may switch the uni-directional wireless audio connection to a low-quality bi-directional wireless audio connection in order to provide hands-free communication with the audio output device, as described herein. Although less preferable than the uni-directional wireless audio connection due to having a lower audio quality, in some cases such functionality may be required or needed based on one or more criteria. The switch to the low-quality bi-directional connection is described in FIG. 13b.

In one aspect, the switch to a bi-directional wireless audio connection may be based on the location of the local device 2 and/or the audio output device 6. For example, as described herein, when transitioning to the uni-directional wireless audio connection, the position of the microphone used during the call and prior to the initiation of the joint media playback session may be at the audio output device, which may be a wireless headset worn on the user's head. Once uni-directional connection is initiated, however, the position of the (e.g., active) microphone may change to a different microphone (e.g., the microphone 23 of the local device), which may be separate from the audio output device. Thus, the microphone(s) and speaker(s) used during the call and the joint media playback session may be a part of different electronic devices, each device at a different location. As a result, in order to participate in the call and the joint session, the local user may be required to have both the local device and the audio output device in close proximity (e.g., in order for the microphone to capture the user's voice and in order for the user to hear the sound produced by the audio output device's speaker). In one aspect, the decision logic may receive sensor data from one or more sensors 40, and may be configured to determine whether the local device and audio output device are separated by a threshold distance. For example, the decision logic may receive image data from one or more cameras (e.g., camera 24), and use the image data to determine the position of the audio output device by using an image recognition algorithm. In another aspect, the decision logic may determine the position of the audio output device based on the RSSI of the uni-directional connection. For example, in response to determining that the RSSI is below a threshold value, the decision logic may perform the switch to the bi-directional connection. Since the user may be too far away from the new active microphone for it to clearly pick up the local user's voice.

In another aspect, the decision may be based on whether the local user is positioned in front of (or next to) the display screen 25 of the local device. For example, the camera 24 may be positioned adjacent to the display screen and with a field of view that is in front of the display screen. The decision logic may receive image data from the camera and perform the image recognition algorithm to determine whether a user is present (e.g., in front of the display screen). If not, the decision logic may perform the switch. In some aspects, the decision logic may make this determination based on other sensor data, such as proximity sensor data. In this case, one or more proximity sensors may be arranged to determine whether an object is within a threshold distance from the display screen 25. If not, which indicates the local user is not in front of the display screen, the decision logic may perform the switch.

In another aspect, the decision logic 13 may perform the switch based on whether an object is within a threshold distance from the (e.g., microphone 23 of the) local device. For example, when the local device is a smartphone, the user may place the smartphone in a pocket. In which case, the microphone may capture a muffled user's voice. Thus, the decision logic may receive sensor data that indicates whether an object is within a threshold distance. For instance, the sensor may be a proximity sensor. In response to the object being within the distance, the decision logic may perform the switch.

In some aspects, the decision logic may perform the switch based on whether the local user is speaking. For example, during moments in which the local user is not speaking, the microphone may not be necessary and thus a uni-directional wireless connection may be established in order to provide high-quality audio. In response, however, to determining that the local user is speaking, the decision logic may perform the switch. For instance, the decision logic may receive a control signal from the audio output device in response to the local user speaking, and the switch may be performed based on the received control signal. For example, when the control signal is a VAD signal produced by VAD 82 of the audio output device in response to detecting a high energy level of an accelerometer signal from accelerometer 79, the decision logic may determine that the local user is speaking. In another aspect, the VAD signal may be received from a VAD of the local device (e.g., VAD 42, as illustrated in FIG. 5), which may be configured to detect the local user's voice based on signals received from the audio output device, such as one or more accelerometer signals and/or one or more microphone signals. Once the user is speaking, the decision logic may switch to the bi-directional wireless audio connection, and may activate the output device's microphone 78 to capture the user's voice. Once the user is done speaking (e.g., the VAD signal indicating that the user's voice is no longer detected), the decision logic may switch back to the uni-directional audio connection.

FIG. 13*b* shows a block diagram in which the local device and the audio output device have switched to a bi-directional wireless audio connection, while conducting the joint media playback session and the call, as described herein. Specifically, this figure shows the result of the decision logic 13 switching to the bi-directional wireless audio connection (e.g., based on one or more criteria), during the call and the playback session. As shown, the bi-directional wireless audio connection 89 is a low-quality connection, which may be due to the fact that the audio output device does not support the high-quality connection, as described herein. In addition to transitioning to the bi-directional connection, the local and audio output devices have reverted the (active) position of the microphone form the local device back to the audio output device.

As described in FIGS. 12, 13*a* and 13*b* the local device may participate in a joint media playback session in which one or more audio signals of the media content (e.g., a musical composition) are received for playback. In one aspects, the operations performed in these figures may occur when the local device is participating in a joint playback session in which multi-media content is being played back, for example with video being displayed on display screen 25 and audio being output by speaker 77. In addition, controller 20 and/or controller 75 may also perform at least some other operations described herein.

FIGS. 14-18 are flowcharts of processes 90, 100, 110, 130, and 120, respectively, for performing one or more operations for switching wireless audio connections during a call. In one aspect, at least some of the processes may be performed by one or more devices of the audio system 1, as illustrated in FIG. 1. For instance, at least processes 90, 100, and 110 are performed by (e.g., controller 20 of) the local device 2 and processes 130 and 120 are performed by (e.g., controller 75 of) the audio output device 6. In another aspect, either of the devices may perform any of the operations described herein.

Figure 14:
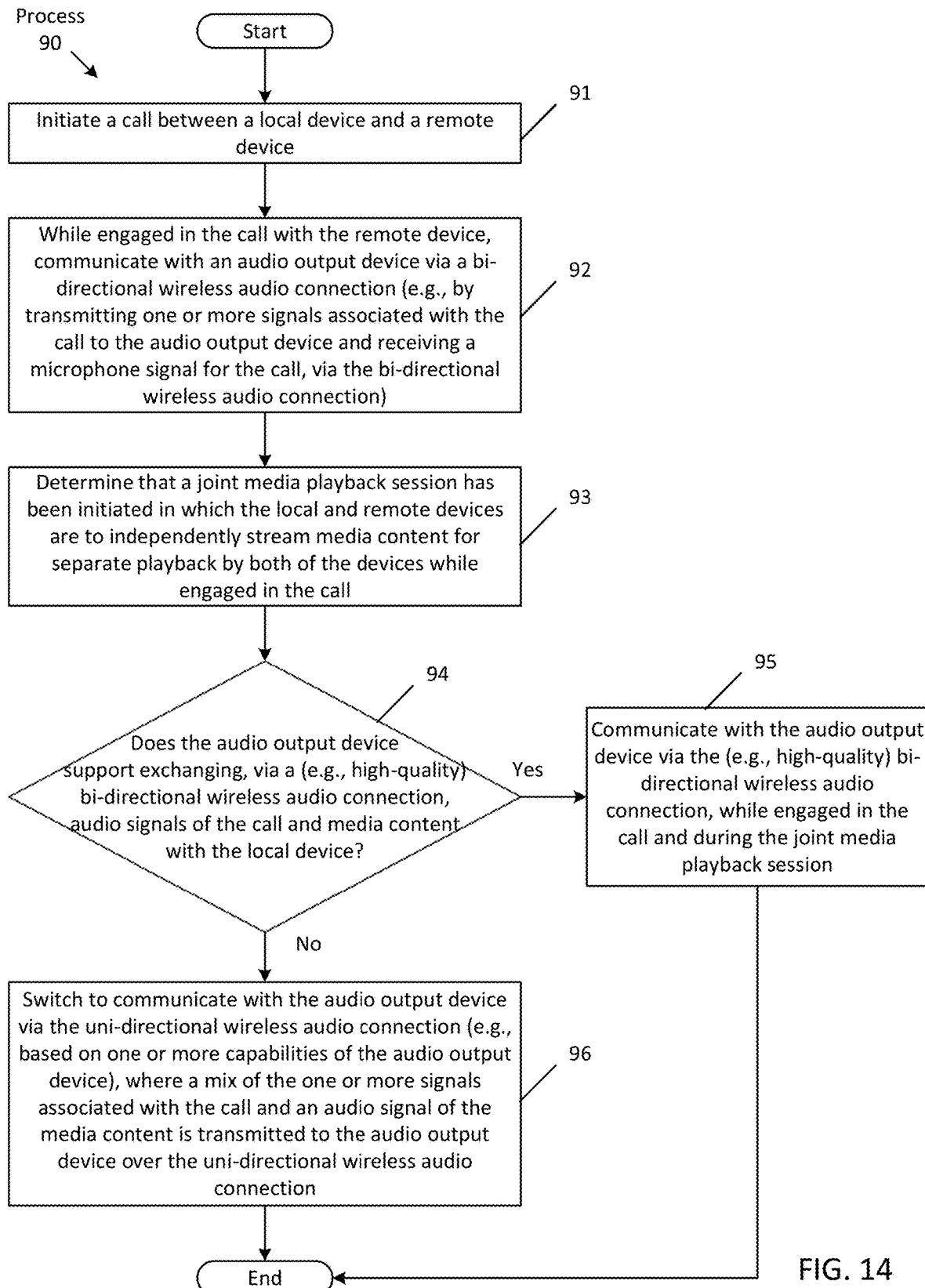
FIG. 14 is a flowchart of one aspect of a process for switching between wireless audio connections.

FIG. 14 is a flowchart of one aspect of a process 90 for switching between wireless audio connections. In one aspect, this process may be performed by controller 20 of the local device 2. The process 90 begins by the controller initiating a call between the local device and a remote device (at block 91). For instance, the call manager 46 may initiate the (e.g., telephony or video) call between the local device and one or more remote devices, as described herein. While engaged in the call with the remote device(s), the controller 20 communicates with an audio output device via a bi-directional wireless audio connection (at block 92). Specifically, the local device 2 may establish a wireless connection with the audio output device via a wireless communication link (e.g., via BLUETOOTH protocol or any other wireless communication protocol). For instance, the local device may communicate with the audio output device to configure the BLUETOOTH stack that is executing within the audio output device to exchange audio data between the devices via a bi-directional wireless audio connection (e.g., by negotiating the codec for decoding and encoding audio signals exchanged between the devices). During this, the audio output device may transmit a message indicating its capabilities (e.g., audio codecs of which it supports, etc.). In one aspect, based on the capabilities, the local device may establish the bi-directional wireless audio connection. In particular, if able to support high-quality audio streams (e.g., at a sampling rate of at least the threshold sampling rate), the local device may establish a high-quality bi-directional wireless audio connection, as described herein. Once established, the local device may transmit one or more (e.g., downlink audio) signals associated with the call to the audio output device and receive one or more microphone signals for the call, via the bi-directional connection. In another aspect, the devices may establish the low-quality wireless audio connection, regardless of the audio output device's capabilities, since only voice data is being exchanged between the devices.

The controller 20 determines that a joint media playback session has been initiated in which the local and remote device(s) are to independently stream media content for separated playback by both of the devices while engaged in the call (at block 93). Specifically, the joint media playback session manager 47 may have received a user request from the local user (e.g., via a UI displayed on display screen 25), or may have received a request from the media content server 5 indicating that one or more remote devices have requested to initiate a playback session.

The controller 20 determines whether to the audio output device supports exchanging, via a (e.g., high-quality) bi-directional wireless audio connection, audio signals of the call and media content with the local device. (at decision block 94) Specifically, the wireless audio connection switch decision logic 13 may switch from the (e.g., currently established) bi-directional wireless audio connection to a uni-directional wireless audio connection, for example based on one or more capabilities of the audio output device 6. For example, the decision logic may determine whether the audio output device supports high-quality audio based on a table lookup into a data structure that associates device identifiers with characteristics. In one aspect, since the bi-directional wireless audio connection is already established, the decision logic may determine the type of connection that is already between the two devices (e.g., whether the connection is a HFP connection that is using a codec with a sampling rate above a threshold rate and/or whether the HFP connection supports stereo audio). If so, the controller communicates with the audio output device via the (e.g., high-quality) bi-directional wireless audio connection, while engaged in the call and during the joint media playback session (at block 95). In one aspect, if the original wireless audio connection is a low-quality connection, the controller may tear down that connection and establish the high-quality bi-directional wireless audio connection. If, however, the originally established bi-directional wireless audio connection is a high-quality connection, the controller may maintain the existing connection.

If, however, the audio output device does not support a high-quality bi-directional wireless audio connection, the controller 20 switches to communicate with the audio output device via the uni-directional wireless audio connection (e.g., based on one or more capabilities of the audio output device, as described herein), where a mix of one or more signals associated with the call and an audio signal of the media content is transmitted to the audio output device over the uni-directional wireless audio connection (at block 96). Specifically, as described herein, the controller 20 may tear down the bi-directional wireless audio connection and establish the uni-directional connection. Once established, the controller may stream the media content and the downlink audio signal of the call to the audio output device for playback. More about the operations for switching wireless audio connections is described in FIG. 15.

Figure 15:
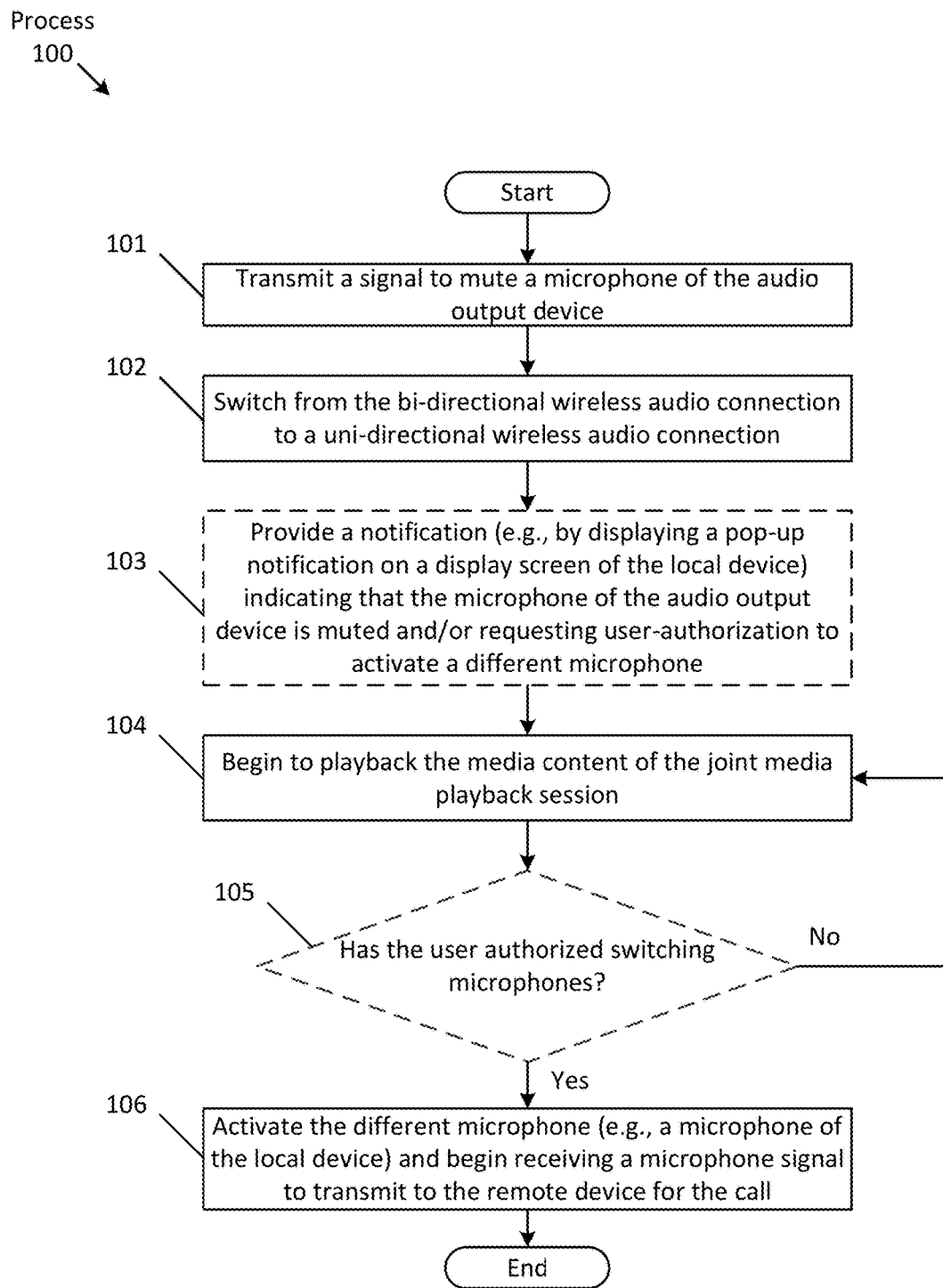
FIG. 15 is a flowchart of another aspect of a process for switching between wireless audio connections.

FIG. 15 is a flowchart of another aspect of a process 100 for switching between wireless audio connections. In one aspect, at least some of the operations performed in the process 100 may be performed by the controller 20 when (and/or after) switching to communicate with the audio output device via the uni-directional wireless audio connection, as described in block 96 of FIG. 14. The process 100 begins by the controller transmitting a signal to mute a microphone (e.g., microphone 78) of the audio output device (at block 101). Specifically, the controller may transmit a control signal, over the bi-directional wireless audio connection, to the audio output device for controller 75 to mute the microphone 78. In one aspect, muting the controller 75 may mute the microphone 78 by ceasing to transmit the microphone signal produced by the microphone to the local device. In which case, the microphone 78 may continue to produce a microphone signal, which the controller 75 may use to perform one or more operations (e.g., performing an ANC function, a transparency function, etc.). The controller 20 switches from the bi-directional wireless audio connection to a uni-directional wireless audio connection (at block 102). As described herein, the uni-directional wireless audio connection may be any wireless connection that provides high-quality audio (e.g., A2DP connection). In one aspect, the uni-directional connection may be based on a capabilities of the audio output device.

The controller 20 provides a notification indicating that the microphone of the audio output device is muted and/or requesting user-authorization to activate a different microphone (at block 103). For example, the controller may display the notification as a pop-up notification on the display screen 25 of the local device 2, alerting the local user that the microphone is muted. In one aspect, this is to alert the user so that the user does not begin to speak before a microphone is active. In some aspects, the notification may also indicate the new position of the microphone. Specifically, the notification may indicate that the position of the microphone may be at the local device. In one aspect, the notification may also request user-authorization to activate the different microphone (e.g., by displaying a UI item within the pop-up notification).

The controller 20 begins to playback the media of the joint media playback session (at block 104). Specifically, the controller 20 may begin to transmit one or more audio signals of the media content, via the uni-directional connection, to the audio output device, which may use the signals to drive one or more speakers. In addition, when the media content includes video, the controller may display video signals on the display screen 25. The controller determines whether the user has authorized switching the microphones (at decision block 105). For instance, the controller may determine whether the user has selected the UI item displayed in the pop-up notification. If not, the controller may continue to playback the media content, while no microphone of the local device and/or the audio output device is active to capture the user's voice for an uplink signal of the call. If, however, the controller has received user authorization, the controller activates the different microphone and begins to receive a microphone signal to transmit to the remote device (e.g., as an uplink signal) for the call (at block 106).

In one aspect, the controller may provide the user with a selection of microphones of which the user may activate for the call. For instance, the pop-up notification may display a list of microphones and their positions in order for the local user to make a decision for which microphone to use during the call. In another aspect, the user may be provided the choice of having the local device continue to communicate with the audio output device via the bi-directional wireless audio connection. For example, the controller may provide a notification requesting user-authorization to perform the switch from the bi-directional wireless audio connection to the uni-directional wireless audio connection. If the user fails to provide a response (and/or does not provide authorization by selecting a UI item), the controller may continue to communicate within the bi-directional wireless audio connection, which based on the audio output device's capabilities may be the low-quality connection, as described herein.

Figure 16:
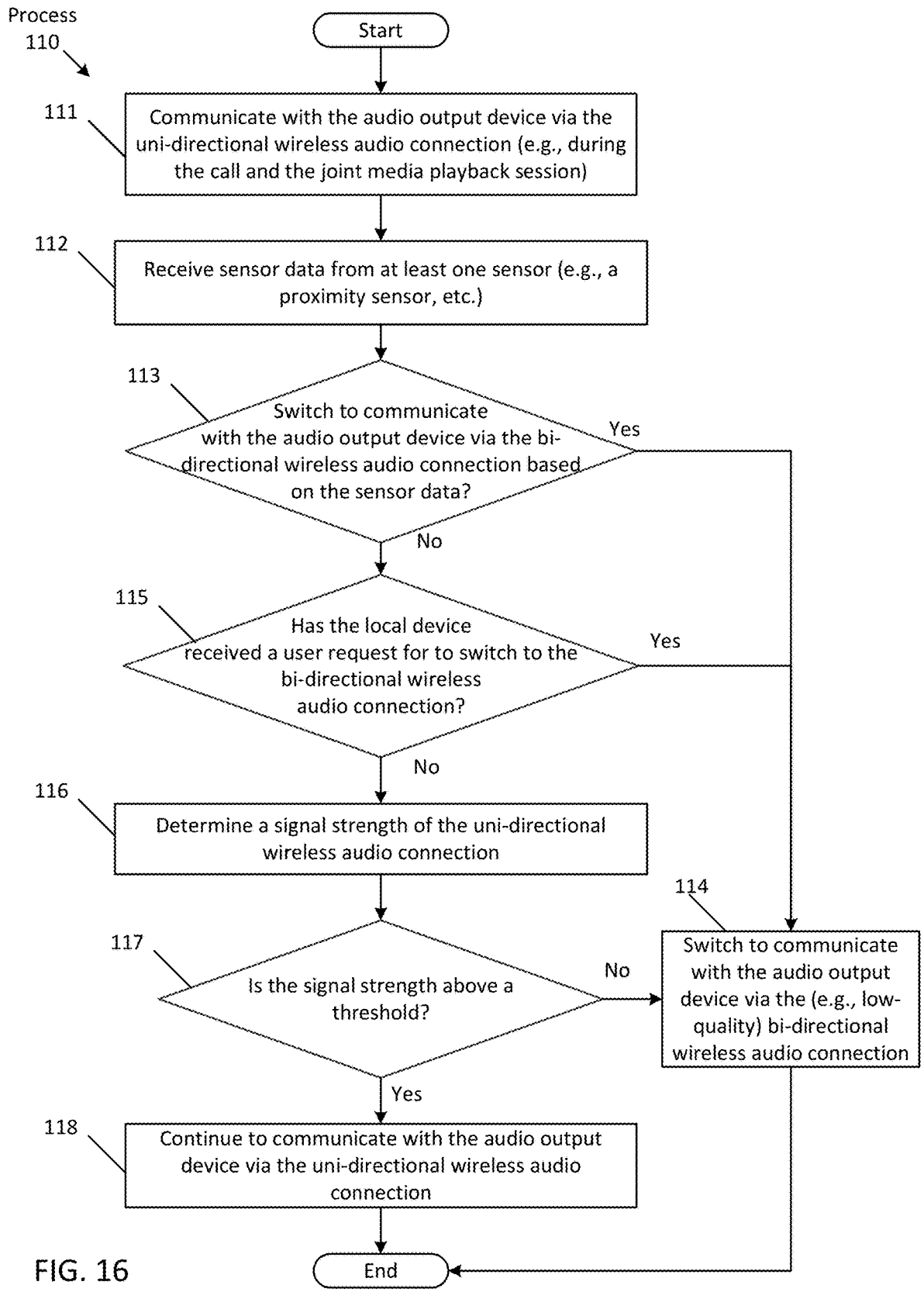
FIG. 16 is a flowchart of one aspect of a process for determining whether to switch between wireless audio connections based on one or more criteria.

FIG. 16 is a flowchart of one aspect of a process 110 for determining whether to switch between wireless audio connections based on one or more criteria. Specifically, this process is for determining whether to transition from communicating with the audio output device via the uni-directional wireless audio connection to communicating with the device via the (e.g., low-quality) bi-directional wireless audio connection. The process 110 begins by the controller 20 communicating with the audio output device via the uni-directional wireless audio connection, for example during a call and a joint media playback session, as described herein (at block 111). The controller 20 receives sensor data from at least one sensor (at block 112). For example, the controller may receive sensor data from a proximity sensor, a light sensor, a microphone (e.g., microphone 23), a camera (e.g., camera 24), etc. The controller 20 determines whether to switch to communicate with the audio output device via the bi-directional wireless audio connection based on the sensor data (at decision block 113). As described herein, the controller may uses sensor data, such as proximity data from a proximity sensor to determine whether an object is within a threshold distance. In response to being within a threshold distance, the controller 20 switches to communicate with the audio output device via the bi-directional wireless audio connection (at block 114). As described herein, the bi-directional connection may be a low-quality (e.g., traditional 8 kHz HFP) connection, based on the audio output device's capabilities.

If, however, the controller determines not to switch based on sensor data, the controller determines if the local device has received a user request to switch to the bi-directional wireless audio connection (at decision block 115). For example, the local device may display a UI item on display screen 25 that allows the local user to switch to the bi-directional wireless audio connection. In one aspect, the user may wish to switch to the bi-directional connection for various reasons. For example, the user may wish to use the on-board microphone of the audio output device when the environment in which the user is located has ambient noise. If so, the controller proceeds to switch connections.

If not, the controller determines a signal strength of the uni-directional wireless audio connection (at block 116). For example, the controller may determine the RSSI of the connection. The controller determines whether the signal strength is above a threshold (at decision block 117). If not, the controller may proceed to switch connections. In one aspect, the signal strength may be low due to the user walking away from the local device, while continuing to wear the audio output device. For example, when the local device is a desktop computer with an on-board microphone being used to pick-up the user's voice for the call, if the user walks away, the controller may perform the switch in order to keep the active microphone within a distance of the user. If the signal strength is above the threshold, the controller may continue to communicate with the audio output device via the uni-directional wireless audio connection (at block 118).

In one aspect, the controller may switch back to the uni-directional wireless audio connection when at least one of the conditions which caused the controller switch ends. For instance, while communicating with the audio output device via the bi-directional wireless audio connection, upon determining that the signal strength is above the threshold, the controller may switch back to the uni-directional wireless audio connection. Continuing with the previous example, when the signal strength is above the threshold, it may be determined that the user is now in front of the desktop computer.

Figure 17:
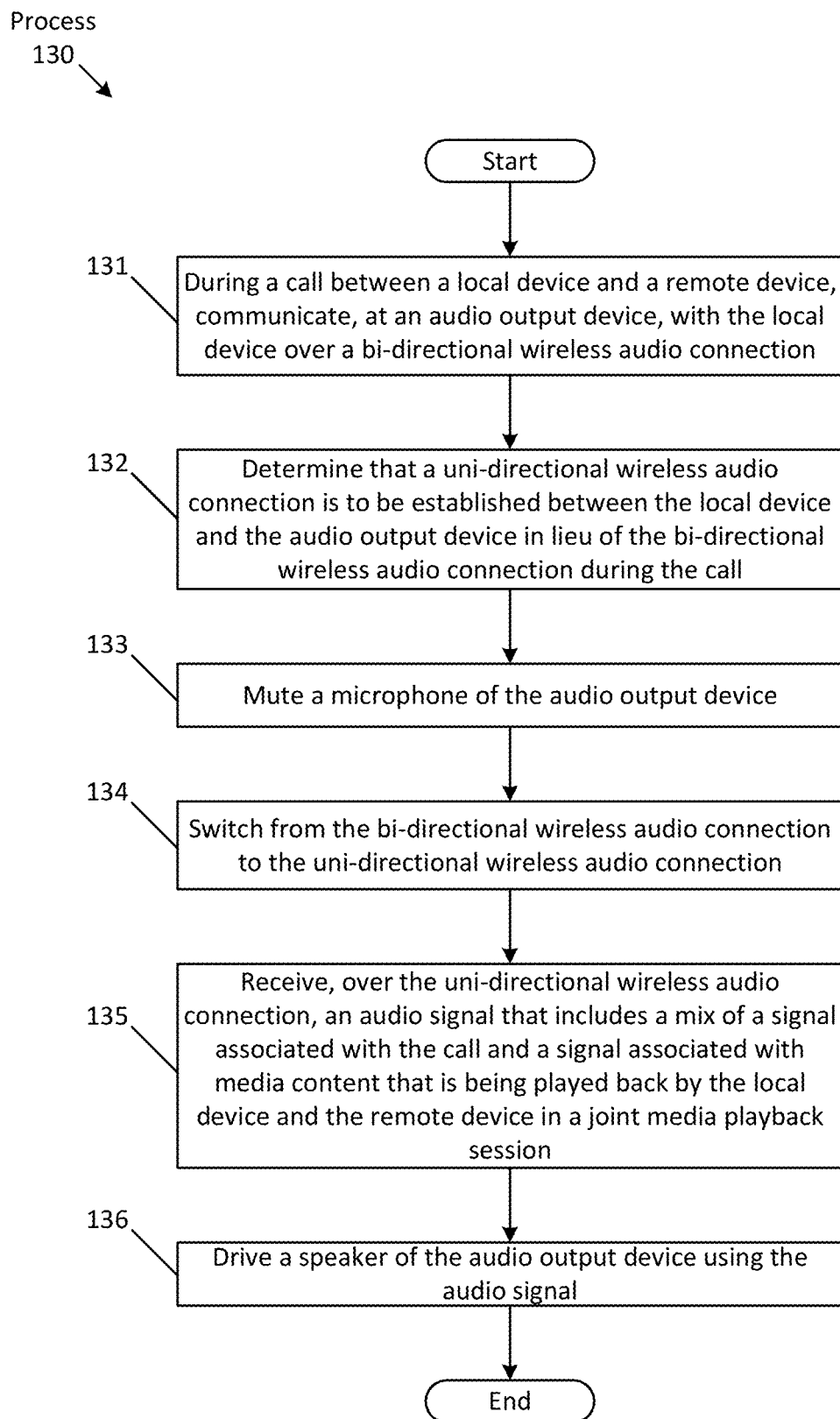
FIG. 17 is a flowchart of one aspect of a process performed by the audio output device for switching between wireless audio connections.

FIG. 17 is a flowchart of one aspect of a process 130 performed by (e.g., controller 75 of) the audio output device 6 for switching between wireless audio connections. The process 130 begins by the controller 75 communicating, during a call between the local device 2 and the remote device 3, with the local device over a bi-directional wireless audio connection (at block 131). For instance, the audio output device may be performing hands-free communication with the local device during the call, as described herein. The controller 75 determines that a uni-directional wireless audio connection is to be established between the local device and the audio output device in lieu of the bi-directional wireless audio connection during the call (at block 132). For instance, the determination may be based on whether the bi-directional connection may support high audio quality. In one aspect, the existing bi-directional connection may support exchanging audio signals at a sampling rate that is lower than a sampling rate at which the uni-directional connection supports. For example, the bi-directional connection may be an HFP connection that supports a sampling rate of 8-16 kHz, whereas the uni-directional connection may be a A2DP connection that supports 48 kHz sampling rate. In one aspect, the audio output device may receive a control signal (e.g., from the local device) indicating that the bi-directional wireless audio connection is to be tore down. The controller 75 mutes a microphone of the audio output device (at block 133). As described herein, the controller 75 may deactivate the microphone and/or cease transmitting the microphone signal to the local device. The controller 75 switches from the bi-directional wireless audio connation to the uni-directional wireless audio connection (at block 134). For instance, the audio output device may tear down the bi-directional connection, and transmit an acknowledgment message to the local device indicating that the connection has been tore down. Subsequently, the audio output device may receive a communication from the local device to establish the bi-directional wireless audio connection. In response, the audio output device may establish the connection. The controller 75 receives, over the uni-directional wireless audio connection, an audio signal that includes a mix of a signal associated with the call and a signal associated with the media content that is being played back by the local device and the remote device in a joint media playback session (at block 135). The controller may then drive a speaker (e.g., speaker 77) of the audio output device using the audio signal (at block 136).

Figure 18:
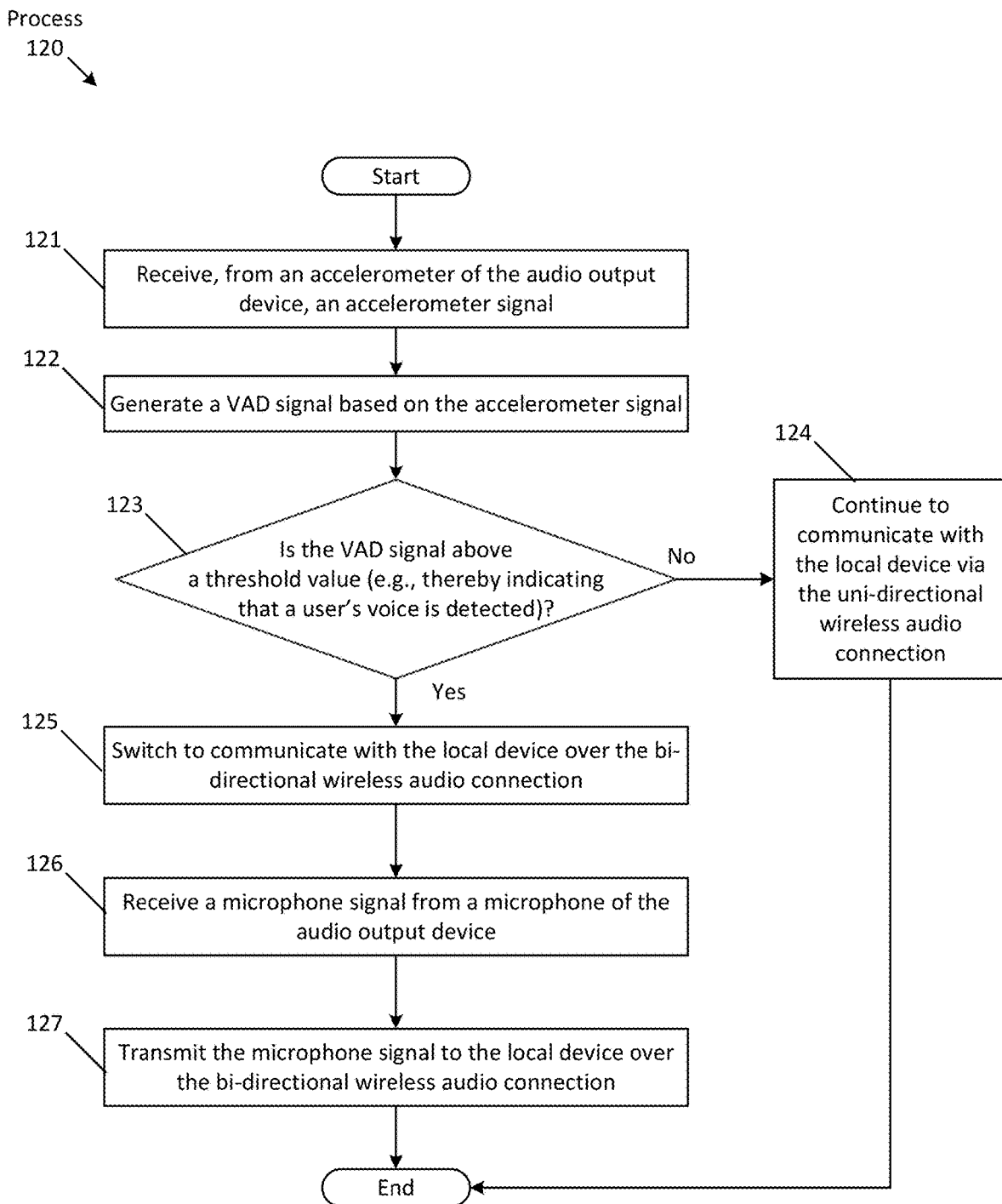
FIG. 18 is a flowchart of one aspect of a process performed by the audio output device for switching from the uni-directional wireless audio connection to the bi-directional wireless audio connection based on whether speech is detected.

FIG. 18 is a flowchart of one aspect of a process 120 performed by the audio output device 6 for switching from the uni-directional wireless audio connection to the bi-directional wireless audio connection based on whether speech is detected. In one aspect, prior to performing the process 120, the audio output device 6 may be communicatively coupled with the local device via the uni-directional connection to receive audio data of media content being played back by the local device during a joint media playback session simultaneously with a call, as described herein. For instance, the audio output device may be receiving, over the uni-directional connection an audio signal that includes a mix of 1) a signal of a telephony (or video) call and 2) a signal associated with media content, where the local device and remote device(s) are simultaneously engaged in the call and joint media playback session. In addition, the audio output device may be driving a speaker using the audio signal. The process 120 begins by the controller 75 receiving, from an accelerometer of the audio output device (e.g., accelerometer 79), an accelerometer signal (at block 121). The controller 75 generates a VAD signal (e.g., as output by VAD 82) based on the accelerometer signal (at block 122). As described herein, the VAD signal may indicate that the user's voice is detected based on the energy level of the accelerometer. The controller 75 determines if the VAD signal is above a threshold value, thereby indicating that a user's voice is detected (at decision block 123). If not, the audio output device continues to communicate with the local device via the uni-directional wireless audio connection (at block 124).

Otherwise, the controller 75 switches to communicate with the local device over the bi-directional wireless audio connection (at block 125). The controller 75 receives a microphone signal from a microphone of the audio output device (at block 126). The controller 75 then transmits the microphone signal to the local device over the bidirectional wireless audio connection to be transmitted to the remote devices as an uplink signal, as described herein (at block 127).

Some aspects may perform variations to the processes 90, 100, 110, 130, and 120 described in FIGS. 14-18. For example, the specific operations of at least some of the processes may not be performed in the exact order shown and described. The specific operations may not be performed in one continuous series of operations and different specific operations may be performed in different aspects. For example, the operations within dashed boxes may be optional operations that may not be performed while a respective process is performed. For example, in process 100 of FIG. 15, the notification does not need to be provided. Instead, playback of the media content may begin (at block 104) and the different microphone may be activated (at block 106) in response to the connections being switched.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a first electronic device that is communicatively coupled to a wireless headset, the method comprising:
    while engaged in a call with a second electronic device, communicating with the wireless headset via a bi-directional wireless audio connection;
    determining that a joint media playback session has been initiated in which the first and second electronic devices are to independently stream media content for separate playback by both of the first and second electronic devices while engaging in the call; and
    switching to communicate with the wireless headset via a uni-directional wireless audio connection based on a determination of one or more capabilities of the wireless headset, wherein a mix of 1) one or more signals associated with the call and 2) an audio signal of the media content is transmitted to the wireless headset over the uni-directional wireless audio connection.

2. The method of claim 1, wherein the determination of the one or more capabilities of the wireless headset comprises determining whether the wireless headset supports exchanging, via the bi-directional wireless audio connection, audio signals with the first electronic device at a sampling rate that is at least a threshold sampling rate.

3. The method of claim 2, wherein the threshold sampling rate is 24 kHz.

4. The method of claim 1, further comprising:
    transmitting a signal to mute a microphone of the wireless headset; and
    activating a microphone of the first electronic device to capture a user's voice.

5. The method of claim 4 further comprising displaying a pop-up notification on a display screen of the first electronic device indicating that the microphone of the wireless headset is muted and requesting user-authorization to activate the microphone of the first electronic device, wherein the microphone of the first electronic device is activated in response to receiving user input at the first electronic device.

6. The method of claim 1 further comprising:
    receiving sensor data from at least one sensor of the first electronic device that indicates whether an object is within a threshold distance of the first electronic device; and
    in response to the object being within the threshold distance, switching to communicate with the wireless headset via the bi-directional wireless audio connection.

7. The method of claim 1 further comprises:
    determining a signal strength of the uni-directional wireless audio connection; and
    in response to determining that the signal strength is below a threshold value, switching to communicate with the wireless headset via the bi-directional wireless audio connection.

8. The method of claim 1 further comprising:
    receiving, from the wireless headset, a control signal that indicates a detection of a user's voice; and
    in response to the control signal, switching to communicate with the wireless headset via the bi-directional wireless audio connection.

9. The method of claim 8, wherein the control signal is a first control signal, wherein the method further comprises, in response to receiving a second control signal that indicates the user's voice is no longer detected, switching back to communicate with the wireless headset via the uni-directional wireless audio connection.

10. The method of claim 1 further comprising applying a scalar gain on the mix for at least a period of time after switching to communicate with the wireless headset via the uni-directional wireless audio connection.

11. The method of claim 1 further comprising, while communicating with the wireless headset via the bi-directional wireless audio connection, applying noise reduction to the one or more signals associated with the call.

12. The method of claim 11 further comprising ceasing to apply the noise reduction to the one or more signals associated with the call in response to switching to communicate with the wireless headset via the uni-directional wireless audio connection.

13. The method of claim 1 further comprising, while the first electronic device communicates with the wireless headset via the uni-directional wireless audio connection,
    obtaining a microphone signal from a microphone of the first electronic device to be transmitted to the second electronic device while both devices are engaged in the call;
    generating an estimate of a portion of the one or more signals associated with the call; and
    using the estimate to perform echo cancellation upon the microphone signal.

14. A first device, comprising:
    a processor; and
    memory having instructions stored therein which when executed by the processor causes the first device to:
        communicate with a wireless headset via a bi-directional wireless audio connection while engaged in a call with a second device;

determine that a joint media playback session has been initiated in which the first and second devices are to independently stream media content for separate playback by both of the first and second devices while engaging in the call; and switch to communicate with the wireless headset via a uni-directional wireless audio connection based on a determination of one or more capabilities of the wireless headset, wherein a mix of 1) one or more signals associated with the call and 2) an audio signal of the media content is transmitted to the wireless headset over the uni-directional wireless audio connection.

15. The first device of claim 14, wherein the determination of the one or more capabilities of the wireless headset comprises instructions to determine whether the wireless headset supports exchanging, via the bi-directional wireless audio connection, audio signals with the first device at a sampling rate that is at least a threshold sampling rate.

16. The first device of claim 15, wherein the threshold sampling rate is 24 kHz.

17. The first device of claim 14, wherein the memory has further instructions to:

transmit a signal to mute a microphone of the wireless headset; and activate a microphone of the first device to capture a user's voice.

18. The first device of claim 17 further comprises a display screen, wherein the memory has further instructions to display a pop-up notification on the display screen indicating that the microphone of the wireless headset is muted and requesting user-authorization to activate the microphone of the first device, wherein the microphone of the first device is activated in response to receiving user input at the first device.

19. The first device of claim 14, wherein the memory has further instructions to:

receive, from the wireless headset, a control signal that indicates a detection of a user's voice; and in response to the control signal, switching to communicate with the wireless headset via the bi-directional wireless audio connection.

20. The first device of claim 19, wherein the control signal is a first control signal, wherein the memory has further instructions to, in response to receiving a second control signal that indicates that the user's voice is no longer detected, switching back to communicate with the wireless headset via the uni-directional wireless audio connection.

21. A method comprising:

during a call between a first electronic device and a second electronic device, communicating, at a wireless headset, with the first electronic device over a bi-directional wireless audio connection;

determining that a uni-directional wireless audio connection is to be established between the first electronic device and the wireless headset in lieu of the bi-directional wireless audio connection during the call;

in response to determining that the uni-directional wireless audio connection is to be established, muting a microphone of the wireless headset, and switching from the bi-directional wireless audio connection to the uni-directional wireless audio connection;

receiving, over the uni-directional wireless audio connection, an audio signal that includes a mix of a signal associated with the call and a signal associated with media content that is being played back by the first and second electronic device in a joint media playback session; and driving a speaker of the wireless headset using the audio signal.

22. The method of claim 21, wherein the bi-directional wireless audio connection supports exchanging audio signals at a sampling rate that is lower than a sampling rate at which the uni-directional wireless audio connection supports transmitting audio signals.

23. The method of claim 21, wherein determining that the uni-directional wireless audio connection is to be established comprises receiving, from the first electronic device, a control signal to establish the uni-directional wireless audio connection.

24. The method of claim 21 further comprising:

detecting, using an accelerometer of the wireless headset, a user's voice at the wireless headset; and in response to detecting the user's voice, switching from the uni-directional wireless audio connection to the bi-directional wireless audio connection.

25. The method of claim 24 further comprising, in response to detecting the user's voice, activating the microphone of the wireless headset and transmitting a microphone signal produced by the microphone, via the bi-directional wireless audio connection, to the first electronic device for the call.

26. The method of claim 25 further comprising, in response to ceasing to detect the user's voice, muting the microphone and switching from the bi-directional wireless audio connection to the uni-directional wireless audio connection.

* * * * *